(12) United States Patent
Pinson et al.

(10) Patent No.: US 8,566,088 B2
(45) Date of Patent: Oct. 22, 2013

(54) SYSTEM AND METHOD FOR AUTOMATIC SPEECH TO TEXT CONVERSION

(75) Inventors: Mark Pinson, Granada Hills, CA (US); David Pinson, Sr., Bowie, MD (US); Mary Flanagan, Framingham, MA (US); Shahrokh Makanvand, Santa Clarita, CA (US)

(73) Assignee: SCTI Holdings, Inc., Silver Spring, MD (US)

( * ) Notice: Subject to any disclaimer, the term of this patent is extended or adjusted under 35 U.S.C. 154(b) by 688 days.

(21) Appl. No.: 12/616,723

(22) Filed: Nov. 11, 2009

(65) Prior Publication Data

US 2010/0121638 A1    May 13, 2010

Related U.S. Application Data

(60) Provisional application No. 61/113,910, filed on Nov. 12, 2008.

(51) Int. Cl.
*G10L 15/10*    (2006.01)
(52) U.S. Cl.
USPC ............................... 704/235; 704/239
(58) Field of Classification Search
USPC .............................. 704/231–257
See application file for complete search history.

(56) References Cited

U.S. PATENT DOCUMENTS

| | | | |
|---|---|---|---|
| 5,749,066 A * | 5/1998 | Nussbaum | 704/232 |
| 5,799,276 A | 8/1998 | Komissarchik et al. | |
| 6,760,700 B2 | 7/2004 | Lewis et al. | |
| 2006/0149558 A1 | 7/2006 | Kahn et al. | |

FOREIGN PATENT DOCUMENTS

| | | |
|---|---|---|
| JP | 2002-156997 | 5/2002 |
| JP | 2003-177776 | 6/2003 |
| JP | 2008-009120 | 1/2008 |

OTHER PUBLICATIONS

Int'l Search Report and Written Opinion in related application PCT/US09/64214, ISR mailed on Jan. 12, 2010, 9 pages.

\* cited by examiner

*Primary Examiner* — Abul Azad
(74) *Attorney, Agent, or Firm* — Michael A. Glenn; Perkins Coie LLP

(57) ABSTRACT

Speech recognition is performed in near-real-time and improved by exploiting events and event sequences, employing machine learning techniques including boosted classifiers, ensembles, detectors and cascades and using perceptual clusters. Speech recognition is also improved using tandem processing. An automatic punctuator injects punctuation into recognized text streams.

19 Claims, 18 Drawing Sheets

Perceptual Contrast Formula:
$$C_{AB} = \frac{(A_{Average} - B_{Average})}{(A_{Average} + B_{Average} + \varepsilon)};$$
Where $A_{Average}$ and $B_{Average}$ are average interval values.
Parameter $\varepsilon$ is the minimum perceptual activation level value.
FIG. 10
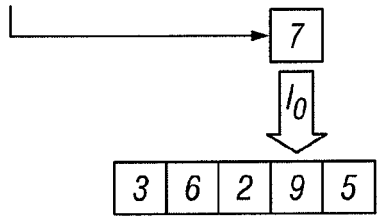
FIG. 11A
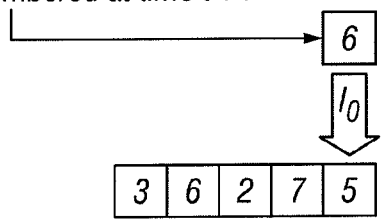
FIG. 11B
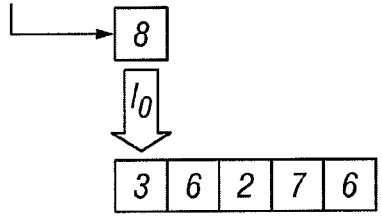
FIG. 11C Original utterance:

| is falling from the sky today at |

Input segment to engine A:

| Is falling from the sky |

Input segment to engine B:

| from the sky today at |

Engine A

Engine B

Output from A

| is falling from the sky |

Output from B

| done the sky today at |

Weighting Analysis and Output Engine

Output

| is falling from the sky today at |

*FIG. 18*

SYSTEM AND METHOD FOR AUTOMATIC SPEECH TO TEXT CONVERSION

CROSS REFERENCE TO RELATED APPLICATIONS

This patent application claims the benefit of U.S. provisional patent application Ser. No. 61/113,910, Automated Speech Processors and Automated Punctuator, filed Nov. 12, 2008, the entirety of which is incorporated herein by this reference thereto.

BACKGROUND OF THE INVENTION

1. Technical Field

The invention relates generally to automatic speech recognition. More specifically, the invention relates to techniques for improving automatic speech recognition by using the most robust and relevant aspects of the speech signal, including temporal information, and patterns derived from perceptual clusters and processing that information using novel machine learning techniques.

2. Description of the Related Art

Speech perception information is non-uniformly distributed in frequency, amplitude and time. In every aspect, speech is highly variable. Most automatic speech recognition systems extract information at uniformly spaced intervals at a single scale. In human speech perception, some speech classes are known to be distinguished by appeal to temporal characteristics, but in typical state-of-the-art speech recognition systems the temporal aspects of speech are not fully exploited.

Most state-of-the-art automatic speech recognition systems include a process which extracts information from the speech signal at uniform time steps (typically 10-15 milliseconds) using uniform short duration (typically 20-30 milliseconds) analysis frames. Classification of speech based on a single short term observation vector is not reliable because the speech signal is highly dynamic and constantly transitioning as the various speech sounds are made. Indeed, longer term patterns must be employed to create usable systems.

A method, known in the art, which makes longer term patterns available, is to retain a memory of a number of short term observation vectors which then are presented to a speech classifier simultaneously. The classifiers used with this approach are often artificial neural networks or correlation templates. While retaining a memory of short term observation vectors brings improved results, there are several remaining problems.

First, the uniform time step sampling, common to all frame based methods, is not synchronous with the speech signal. Therefore the relationship of speech events and observation frames is random. This results in increased variability of extracted features and a quantizing of temporal details.

Next, extraction based on uniform analysis frames is not optimal. The information used for human perception of speech sounds occurs at many different time scales. For example the plosive burst of a spoken "t" sound may be as little as a few milliseconds in duration whereas a vowel may be sustained for more than a second. A sequence of many short term observations does not present the same information as a long term observation does and vice versa.

Some aspects of speech are highly variable in the temporal dimension. For example the length that a vowel is sustained depends on the speaker, the rate of speech, whether the vowel is in a stressed syllable or not, and where in the sentence the word containing the syllable is found. This temporal variability causes speech information to move to different relative observation frames, significantly increasing the variability of the extracted values for different examples of the same speech class and making the detection of meaningful patterns in the memory difficult.

Additionally, frame based systems typically treat all frames as equally important. In contrast, human perception uses the portions of the signal which have the best signal to noise ratio and which contain the characteristics most relevant and reliable to make the required distinctions.

Most state-of-the-art automatic speech recognition systems incorporate Hidden Markov Models. Hidden Markov Models are stochastic state machines. Hidden Markov Models map class probabilities estimated from observation vectors into likely sequences of hidden (unobserved) class productions. Using Hidden Markov Models, the temporal variability problem mentioned above is addressed by allowing each non-emitting state to transition to itself. By using self-transitioning states the temporal variability is "absorbed." Unfortunately, unless the approach is modified to explicitly extract durational information, the approach removes both unwanted and desirable temporal information. The temporal relationships of speech events carry significant information for perception of speech sounds particularly in the discrimination of plosives, affricatives, and fricatives. Furthermore, robust estimation of class probabilities requires large quantities of training data. When the conditions of use differ from the training conditions, the probability estimates become very inaccurate leading to poor recognition.

The features used by most state-of-the-art automatic speech recognition systems are primarily derived from short term spectral profiles. That approach is often taken because many speech sounds have somewhat characteristic frequency peaks called formants. A very different approach employed by other current systems is to focus on the long term trajectories of frequency bands. In a method called TRAPs (Temporal Patterns) speech sounds are modeled as the mean long term (~1 sec.) trajectories of examples of the sounds. Classification is performed based on the correlation of the speech signal envelopes with each of the TRAP models. Some versions of this approach have results reported to be comparable to the short term spectral methods. These results show that information useful to the identity of speech sounds is spread over time beyond the bounds of phoneme segments. Because of the averaging and windowing used in the method, information near the center of the TRAP is emphasized over information further away. TRAP's capture gross trends but do not capture temporal details.

Yet another alternate approach to frame based feature extraction is to segment the speech at the location of certain detectable signal conditions called "events". Each segmented portion is considered to have a single class identity. Usually temporal alignment with a model is performed by dynamic time warping, which allows the feature trajectories to be projected into a common time scale. Then, in the warped time scale the feature trajectory is re-sampled and correlated with a template or used as observations for a Hidden Markov Model. The process of dynamic time warping removes much of the time variability of the speech segments. However, finding reliable segmentation events presents a challenge for event based methods. Event insertions or deletions result in catastrophic misalignments.

Clearly there is a need in the art for improved techniques to increase the efficiency and effectiveness of automatic speech recognition.

Human perception of speech relies, in significant part, on the relative timing of events in the speech signal. The cues to speech perception occur over various time scales and may be offset in time from the perception itself. Changing the temporal relationships of speech events can change the perception of the speech. This is demonstrated in B. Repp, et al., *Perceptual Integration of Acoustic Cues for Stop, Fricative, and Affricative Manner*, Journal of Experimental Psychology: Human Perception and Performance 1978, Vol. 4, Num. 4, 621-637, by perceptual experiments where the durations of silence and frication were manipulated. One such experiment introduces a short interval of silence between the words "Say" and "Shop", which causes listeners to hear "Say Chop." Another example of how the relative timing of events influences perception is referred to as voice onset time, commonly abbreviated VOT. VOT is the length of time that passes from when a stop is released to when the vibration of the vocal cords begins. VOT is an important cue in distinguishing various stop consonants. The importance of timing also derives from the variability of the duration of speech phenomena. Some perceivable speech phenomena are very brief while others are quite long. For example, the TIMIT corpus of phonemically transcribed English speech has stop burst segments with durations of less than 5 milliseconds, while some vowel segments last more than 500 milliseconds.

Though relative event timings are important cues for perception, the most common methods of feature extraction are not sensitive to the timing of speech events. Almost all current speech and speaker recognition applications extract features by utilizing a signal segmentation approach based on fixed length analysis frames stepped forward in time by a fixed step size: Because these analysis frames are fixed in size, they are nearly always either significantly shorter or significantly longer than the lengths of the perceptual phenomena they are attempting to capture.

Though easy to implement, the common approach makes the extraction of features subject to the arbitrary relationship between the signal and the starting point of the first frame and to the arbitrary relationship between the size of the analysis frame and the time scale of various speech phenomena. A frame-based speech recognition system described in S. Basu, et al., *Time shift invariant speech recognition*, ICSLP98, is based on twenty-five millisecond frames stepped by ten milliseconds, shifts in the starting relationship of the signal and the first frame of less than ten milliseconds caused "significant modifications of the spectral estimates and [mel-frequency cepstral coefficients] produced by the front-end which in turn result in variations of up to [ten percent] of the word error rate on the same database."

There are many sources of variability in speech signals: such as the speaker's vocal tract length, accent, speech rate, health, and emotional state, as well as background noise, etc. However, the variation reported by Basu et al. is entirely due to using a method of feature extraction in which the frame size and frame alignment have arbitrary relationships with the signal. In U.S. Pat. No. 5,956,671 (filed Jun. 4, 1997) to Ittycheriah et al. disclosed techniques aimed at reducing feature variability caused by the arbitrary relationship between analysis frames and the speech signal. One aspect of their invention expands the variability of the training set by subjecting multiple time-shifted versions of the signal to the fixed frame analysis process as separate training examples. They also disclose a technique used at recognition time where the feature values are computed by averaging the results of fixed frame analysis to multiple time-delayed versions of the signal.

These techniques do not fully mitigate the problems caused by extracting features using fixed frames and fixed time steps. Moreover, expanding the number of examples increases training time and incorporates additional variability into the model which is not present in the original speech signal. Time-shifted averaging increases computational complexity and may "average out" some perceptually relevant speech characteristics.

In U.S. Pat. No. 6,470,311 (filed Oct. 15, 1999) to Moncur, a method of pitch synchronous segmentation of voiced speech based on the positive zero crossings of the output of a band pass filter with a center frequency approximately equal to the pitch partially addresses synchronization. Unvoiced speech is segmented using the average pitch period computed over some unspecified time frame. It should be noted that low signal-to-noise conditions and signals with small DC signal offsets are known to cause problems for zero crossing based segmentation. For high quality speech signals, Moncur's approach represents an improvement over the common fixed frame analysis method during voiced speech. Unfortunately for unvoiced speech the approach reverts to arbitrary fixed frames and time steps. The use of fixed frames and time steps still leaves the accurate location of events such as closures and stop bursts unsolved. Furthermore, no solution at all is provided for whispered speech.

Clearly a solution is needed which extracts features synchronously with the events of the speech signal itself rather than by fixed uniform frames having arbitrary and changing relationships with speech phenomena. The segmentation technique should apply to the entire signal including both voiced and unvoiced speech. Additionally, speech analysis should be performed over time scales appropriate for each of the particular types of events being detected.

The typical automatic speech recognition engine of today waits for a detected silence to analyze and produce output because this allows for natural segmentation and therefore results in higher accuracy due to the increased context. Waiting until the end of an utterance may cause the output to be delayed anywhere from five to twenty-five seconds. When an application must produce output in near real time, as required in applications such as automatic production of closed captions for television broadcast, smaller segmentation would reduce the available context available for analysis, and lower accuracy is expected and produced. For these types of applications, what is needed is high accuracy with low latency.

SUMMARY OF THE INVENTION

Some embodiments of the invention relate to automatic learning of detectors and classifiers for speech recognition. More particularly, this invention is directed toward the automatic learning of detectors and classifiers which focus on the most robust and relevant aspects of the speech signal for the particular detection or classification task at hand.

Some embodiments of the invention involve extraction of speech signal spikes, or events, that indicate noteworthy aspects of the signal. These embodiments also involve capturing the temporal relationships between the events. In the presently preferred embodiments, a scheme of weighted classifiers is used to extract events. Some embodiments of the invention involve constructing the scheme of weighted classifiers for use in an automatic speech recognition engine. Some embodiments of the invention involve detecting sequences of events instead of, or in addition to, detecting individual events. In some embodiments of the invention, detectors based on alternate cues are developed.

In some embodiments of the invention, adaptive boosting algorithms are used to increase recognition performance.

Some embodiments of the invention include a process to reduce the complexity of ensembles created by adaptive boosting algorithms.

In some embodiments of the invention, a method of automatically creating event-based detector cascades overcomes the problems of learning from highly unbalanced training sets or learning to detect rare objects. The resulting detector cascades provide efficient detection of rare objects by elimination of the majority of negative examples in the early stages.

In some embodiments of the invention, a process of classifying speech into perceptual clusters is carried out. The process then disambiguates between alternative perceptions.

Some embodiments of the invention involve segmenting a speech signal at perceptually important locations. This provides a means to not only extract perceptually relevant timings, but also to synchronize the analysis of the signal with speech events, thus avoiding all of the problems of asynchronous fixed frame analysis. The method first performs a pre-segmentation using low complexity filters based on certain aspects of human perception and the speech phenomena they are intended to detect. These filters detect the locations of perceivable patterns indicative of speech onsets, closures, bursts, glottal pulses, and other significant speech signal events. The pre-segmentation events define intervals which are used to synchronize certain feature computations. The patterns of features which have been synchronously extracted are further processed to create features over longer time scales and to detect still higher level perceptual events such as phoneme boundaries, syllable nuclei, etc.

Preferably, a high level speech recognition system uses all of these techniques. In some embodiments of the invention, a plurality of methods is used in a system for automatic speech recognition. The system receives a speech input, applies one or more of the processing means to the speech input, decides which processing means is most correct, and outputs a resultant text stream. In the presently preferred embodiments of the invention, the automatic speech recognition system is used in real-time television closed-captioning and word spotting environments. [Other embodiments would include virtually any form of speech transcription, including captioning or transcribing meetings or conference calls, real-time dictation or converting oral phone messages to written form.] Some embodiments of the invention involve processing speech signals using n-tandem parallel automatic speech recognition engines in temporally overlapped burst mode to reduce latency. Some embodiments of the invention involve automatically inserting punctuation marks into an unpunctuated text.

BRIEF DESCRIPTION OF THE DRAWINGS

FIG. 10 illustrate a perceptual contrast formula used to compute perceptual change according to some embodiments of the invention;

FIG. 11A illustrates a circular queue memory according to some embodiments of the invention;

FIG. 11B illustrates an updated circular queue memory according to some embodiments of the invention;

FIG. 11C illustrates an updated circular queue memory according to some embodiments of the invention;

FIG. 18 illustrates a representation of two tandem processing engines, overlapping in time, operating on a sequence of utterances according to some embodiments of the invention.

DETAILED DESCRIPTION OF THE INVENTION

Figure 1:
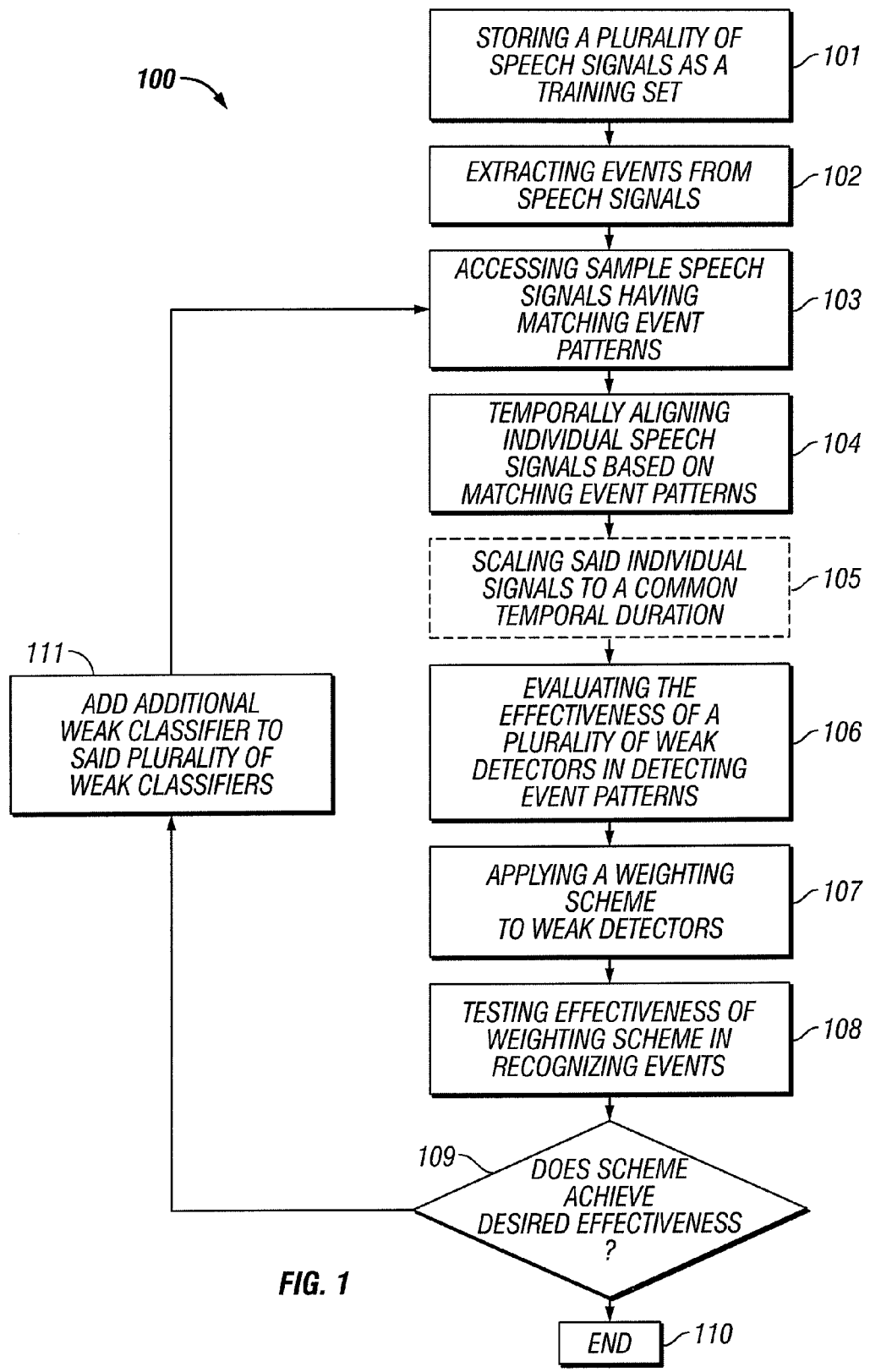
FIG. 1 illustrates an example of a workflow for constructing a scheme of weighted classifiers for use in a processing module of an automatic speech recognition engine according to some embodiments of the invention.

The invention relates to automatic learning of detectors and classifiers for speech recognition. More particularly, this invention is directed toward the automatic learning of detectors and classifiers which focus on the most robust and relevant aspects of the speech signal, including temporal information for the particular detection or classification task at hand.

In the presently preferred embodiments of the invention, the automatic speech recognition system is used in real-time television closed-captioning and word spotting environments.

Though automatic speech recognition has improved over the years it still does not approach human performance. Levels of noise which cause no difficulty for human listeners can often render state-of-the-art automatic speech recognition systems unusable. Improvements in accuracy have come, moreover, at the cost of increased processing time and computational complexity. In significant part these difficulties arise from the fact that the information used by humans for speech perception is non-uniformly distributed in frequency, amplitude, and time. Most automatic speech recognition system treat all points in time as equally relevant to the perception of speech and make all class determinations based on the same set of features. Humans, on the other hand, seem to be able to select those aspects of the speech signal which are most relevant and robust to make the distinctions necessary for perception.

The neural receptors in the ear convert the acoustical signal into temporal patterns of spikes related to its dynamic amplitude and frequency distribution characteristics. The temporal spike patterns encode the information and communicate it to the neurons of the brain for further processing. The neurons and synapses which form the computational units of the brain use spike patterns to encode and communicate information to each other. The efficiency and effectiveness of the human neural machinery's pattern recognition is remarkable. Spike encoding creates a very sparse representation of the signal. Inspired by certain aspects of human perception, the present invention encodes information extracted from the speech signal as spikes, herein referred to as "events".

In the presently preferred embodiments of the invention, event based extraction focuses on the noteworthy aspects of the signal and captures the temporal relationships of these aspects. An example of a type of event would be peaks in the energy envelopes of frequency pass bands. The peaks are the locations in the speech signal where the speech energy in each band is strongest against background noise. The temporal distance between peaks and the sequence of events are strongly related to what is being said. Event extraction is not limited to finding the envelope peaks from band pass filters. Other events include onsets and offsets and events generated by more complex signal analysis including the output of sub-pattern detectors. Classifiers and detectors based on any known method can be incorporated into the event patterns by causing them to fire when the conditions for which they were designed are detected.

Building Relevant Automatic Detectors and Classifiers

As used here, the term "classifiers" refers to a method and apparatus which assign class labels to feature vectors, events, and/or sequences of events. Detectors are classifiers which assign class labels of "present" or "absent" to each feature vector, event, and/or sequence of events.

Weak classifiers are decision functions which perform better than chance. Ensemble classifiers are formed by combining the results of multiple weak classifiers. Boosting is a method known in the art for automatically constructing ensemble classifiers by selecting and weighting weak classifiers such that the decision of the ensemble is better than the decisions of any of the weak classifiers. The selection is done by iteratively evaluating each weak classifier from a relatively large set of weak classifiers and choosing the one which has the best performance on a weighted distribution of labeled training examples. The selected weak classifier is added to the ensemble and its decision is assigned a weight based on its error rate. The distribution weights are then adjusted to emphasize the errors made by the ensemble and the next iteration is begun. Because the examples which were not correctly classified are emphasized in the distribution, weak classifiers which tend to correct the errors of the ensemble are added in subsequent steps and the overall decisions of the ensemble are improved.

Boosting has been shown to generate classifiers with good generalization characteristics. The weak classifiers may take any form as long as their performance is better than chance.

One method of performing temporal pattern classification is to sample the feature trajectories at multiple fixed intervals and to present all of the time-feature points as individual features. Typically, a fixed number of time-feature points are used for classification. With a fixed number of time-feature points, correspondence between information in one example and that of another example is established by the definition of the feature vector.

According to the presently preferred embodiments of the invention, a different approach is used. Because uniform sampling of feature trajectories may miss details which occur between samples and uniform sampling creates many samples containing little discriminate information, the invention instead samples feature trajectories relative to events. Events are the points in the trajectories where significant information is focused. Event based extraction creates a sparse representation of the signal. This approach requires modification of the method of defining weak classifiers typically used in other contexts, such as image processing, because examples of a given class may have zero, one, or more than one events of a given type, therefore a method to establish correspondence between information in one example, and information in another example is needed.

Feature values, events, and patterns of events may provide evidence which is consistent with the target class of the detector or may provide contravening evidence. The types of events, and the temporal relationships between events, represent a significant part of the evidence for or against a detection of the target class. Unfortunately, exact correspondence between event patterns in different examples of the same utterance does not occur. Furthermore, noise may cause spurious or missing events, and the rate of speech may cause temporal variation in the event sequences. Usually machine learning techniques are designed to utilize fixed length feature vectors. With fixed length feature vectors, each positive and negative training example always has a value for every feature and the corresponding of feature values between for each example are found at the same indexed location in the feature vector. Unlike the values in fixed length feature vectors, events and patterns of events may or may not exist and may have somewhat different temporal relationships with each other making it difficult to determine which events from one example corresponds with an event in another example.

The invention defines methods by which correspondence of events and patterns of events between examples may be determined, such that temporal information may be exploited to create weak detectors for boosted ensemble learners.

In the presently preferred embodiments of the invention a temporal origin is associated with an event of a certain kind, and the temporal origins of all examples are aligned. The temporal variations of events representing a certain aspect of speech are bounded by an interval defined relative to the temporal origin. For a given interval, if there is a difference in the consistency with which events (of a certain kind) fall within the interval for the positive class and the negative class, the difference may be exploited to create a weak detector. In some embodiments of this invention, examples are aligned based the location of their syllable nucleus events. In some embodiments of this invention, sets of two or more events are aligned with respect to one of the events within each set.

To make a usable weak detector based on affirmative information associated with events, the intervals defining the weak detector must contain events in a majority the positive examples and must not contain events in a majority of negative examples. Such intervals can be systematically determined by evaluating all intervals containing events from a majority of positive examples. First, the examples are brought into general temporal correspondence by alignment based on a particular common event. Optionally, examples of different overall durations may be scaled to have a common length. The consistent intervals can be efficiently discovered by first, for all of the examples, arranging the events from different sensors (e.g. frequency band sensors) in two dimensional space and recording the accumulated sum of the weighted number of events above and to the left of each event. Then the number of events within any rectangular interval can be determined by simple differences in the accumulated weighted counts. Weak detectors based on each interval containing events for the majority of examples are evaluated and the best detector for the current weighted distribution is retained. The composite detector is evaluated on the entire training set and the distribution weights are adjusted for the errors made.

Weak classifiers are added according to the process above until the detector performance is perfect on the training samples or the maximum number of iterations is reached.

FIG. 1 illustrates an example of a workflow 100 for constructing a scheme of weighted classifiers for use in a processing module of an automatic speech recognition engine. In the presently preferred embodiments of the invention, the weighted classification scheme is used in the classification module of an automatic speech recognition engine, as explained below in connection with FIG. 9. The workflow 100 of FIG. 1 begins by storing a plurality of speech signals as a training set 101 and then extracting event patterns from the training set 102, wherein said event patterns comprise characteristic aspects of the speech signals. Next, a sample of speech signals with matching event patterns are accessed 103 and aligned based on the temporal location of where the event occurred within the speech signal 104. Each signal is then optionally scaled to a common temporal duration 105.

Once the extracted signals are scaled to a common duration with matching event locations, a plurality of weak detectors are applied to the signals and the effectiveness of each weak classifier is tested on its ability to detect the events 106. Based on the measured effectiveness, the weak classifiers are weighted, with those that perform well receiving a high coefficient and those that perform poorly receiving a low coefficient 107.

Next, the effectiveness of the weighting scheme is tested to determine whether the weighting adequately recognizes events in the training set based on a pre-determined threshold of effectiveness 108. The workflow makes a query whether the weighting adequately recognizes events 109. If the weighting scheme performs adequately, the workflow 100 stores the weighting scheme and ends 110. On the other hand, if the weighting scheme does not perform adequately, additional weak classifiers are added to the previously applied group of weak classifiers 111, and the workflow reiterates until the threshold level of effectiveness is met.

The event patterns of different examples of a given utterance have some similarity; however, exact correspondence of events does not occur between any two examples of speech. If events from different examples are given a common time reference, such as being made relative to syllable centers, the corresponding events from different examples of a given utterance will occur within a region in the time-sensor plane. Speech is highly variable and the information most useful for perception is non-uniformly distributed in frequency, amplitude, time, and time-scale. Therefore, specifying regions in the time-sensor plane containing events which contribute certain perceptual information cannot be done effectively using a single constant scale or shape. However, fully evaluating all possible positions, shapes, and scales of regions which might contain collections of relevant corresponding events may be computationally infeasible. Therefore, a process is defined which automatically identifies regions of corresponding events useful for speech perception.

First events from a plurality of positive training examples are made relative to a common time reference, such as syllable centers and the events are projected onto the time-trajectory plane. Optionally, before projection the patterns may be scaled such that their duration is equal to 1. Regions in the time-trajectory plane which contain events from a majority of the positive examples are retained as potential clusters of corresponding events. A list of these regions is formed and used for all subsequent steps of creating weak detectors.

Figure 2:
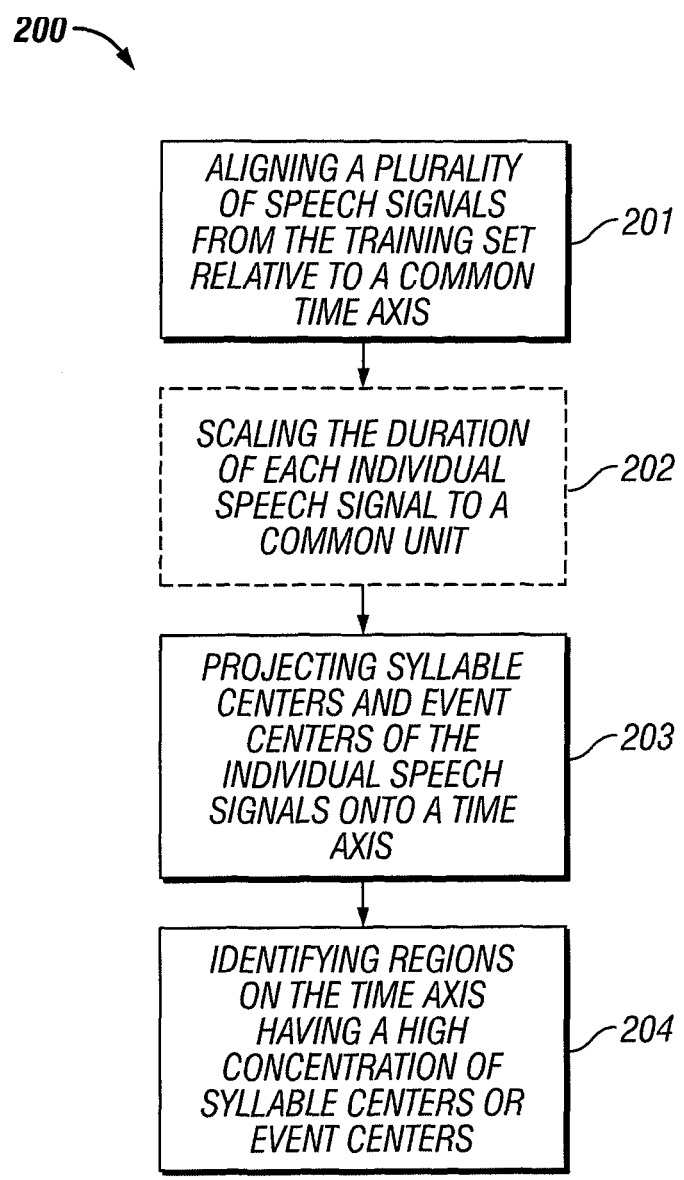
FIG. 2 illustrates a workflow for automatically identifying regions in a plurality of speech signals that contain events according to some embodiments of the invention.

FIG. 2 illustrates an example of a workflow 200 for automatically identifying regions in a plurality of speech signals that contain event patterns according to some embodiments of the invention. The workflow 200 begins by aligning a group of speech signals from a training set of speech signals relative to a common time axis 201. Next, the workflow 200 optionally scales the duration of each individual speech signal in the group to a common time unit duration 202 and projecting syllable centers of the speech signals and the event centers of the speech signals onto the common time axis 203. Finally, the regions on the time axis having a high concentration of syllable centers and event centers are identified as regions containing event patterns 204.

In addition to the disclosed techniques for identifying regions having a high concentration of events, the invention also involves several techniques which are employed to reject regions which are unlikely to result in robust weak detectors including but not limited to event integration mapping, application of example density constraints, rejection of redundant regions, and combinations thereof.

Event Integration Mapping.

In some embodiments of the invention, a process of event integration mapping is employed to reject regions which are unlikely to result in useful weak detectors.

A technique known in the field of image processing which allows the rapid computation of the sum of pixel intensity values over rectangular regions is modified to allow rapid rejection of infeasible regions based on event counts in the region. In the original image processing technique the first step is to compute a "summation map" in which each cell of the map corresponds to the sum of the pixel values in the rectangular region defined by the corner at that cell and the diagonally opposite corner at the origin. After such a summation map has been computed the sum of the pixels of any rectangular sub-region of the image can be determined with two subtraction and one addition operations. The "summation map" technique is adapted for the rapid elimination of regions which cannot contain evidence from more than a specified number of examples by replacing the pixel intensity values with the counts of events in each grid cell of a grid superimposed on the time-trajectory plane. When a summation map of grid cell event counts is computed then a determination of the number of events in any rectangular region can be made using only two subtraction and one addition operations.

Knowing the number of events in the region is not equivalent to knowing the number of examples in the region but it establishes the upper bound. Therefore any region which does not have a count of events greater than or equal to the required number of examples cannot possibly contain the required number of examples.

Figure 3A:
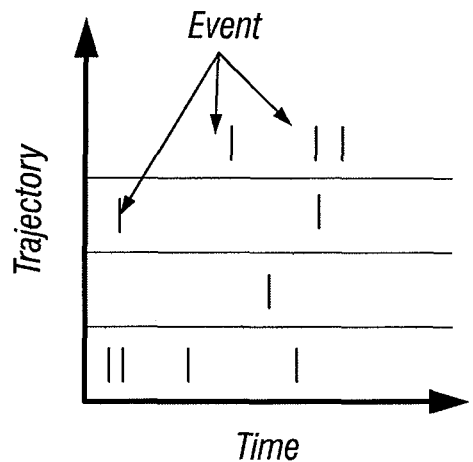
FIG. 3A illustrates the time relationships of events according to some embodiments of the invention.
Figure 3B:
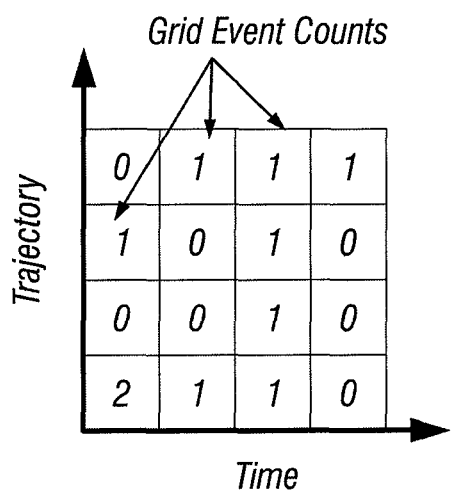
FIG. 3B illustrates the counting of events occurring within grid units of time according to some embodiments of the invention.
Figure 3C:
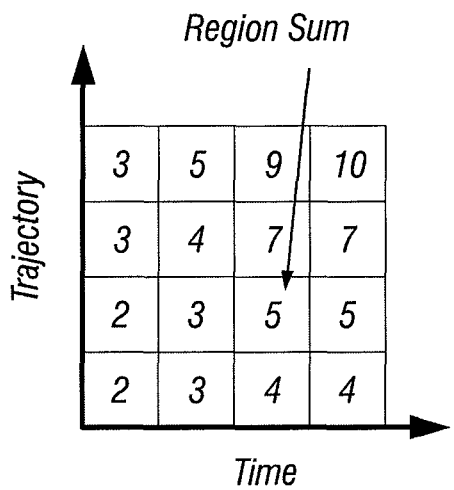
FIG. 3C illustrates the structure of a summation map based on events according to some embodiments of the invention.

FIG. 3A through 3C illustrate the structure of a summation map based on events according to some embodiments of the invention. In FIG. 3A a pattern of events in the time-trajectory plane is depicted. In FIG. 3B the counts of events occurring within the bounds of a superimposed grid are determined. In FIG. 3C a summation map is shown where each cell contains the sum of the counts in the rectangular region having the origin as a corner and the cell as the diagonally opposite corner. To determine the number of events in the center four cells of FIG. 3C, from the value in the upper right cell of the region in question, in this case '7' the value of the non-included region to the left is subtracted in this case '3' as in the non-included region below, in this case '4' and the over subtracted region in the intersection of the two subtracted regions is added back, in this case '2'. This result is the number of events in the region, in this case '2' (7−3−4+2=2). The computational cost of determining the event counts of a region of any size or shape is the same.

Event Density Constraint.

In some other embodiments of the invention, the application of event density constraints is employed to reject regions which are unlikely to result in useful weak detectors. For example, minimal density constraints may be optionally applied to reject regions with an event density below a specified amount.

Redundant Region Rejection.

In some other embodiments of the invention, redundant regions are rejected which are unlikely to result in useful weak detectors. Regions which contain other regions but do not add additional positive events beyond those included within the contained region are not added to the list of regions.

Referring again to FIG. 2, once the regions are identified they form constraints which are used to generate weak detectors. The weak detectors may consist of a simple test to determine whether a given example has any events within the region or not, or may be extended to include additional constraints based on the range of feature values of the positive examples which have events within the region.

Event Sequence Based Speech Recognition

Sequences of events, in general, are more powerful discriminators in automatic speech recognition than the individual events of which they are composed. Some embodiments of the invention involve detecting event sequences of events instead of, or in addition to, detecting individual events.

In some embodiments of the invention, a sequence of events is located as a point in hyper-space by using the (possibly scaled) intervals in temporal-sensor space as coordinates. To understand the concept, consider a sequence of three events produced by a single sensor, in which the second event follows the first by two units of time and the third follows the second by four units of time. The time sequence of these three events with respect to each other is represented by the coordinates (2, 4). The similarity of the temporal sequences may be judged by computing a distance function between the projected points. For example, the Euclidean distance may be used for this purpose. To assess which sequences may consistently appear (or not) in the examples, the sequences of events from a positive example are projected as just described to form a set of standard points which represent possible sequences which may be associated with the positive examples. A standard point is defined based on the coordinates of each of the points from the first example and each standard point's associated count is set to 1. The event sequences from the remainder of the positive events are projected into hyper-space points using their intervals as coordinates in like manner to the first example. As each sequence point is generated it is associated with the closest standard point. The sequence point is added to a list associated with that standard point and the standard points count is incremented by 1. The standard point's coordinates are then adjusted to become the median values of the coordinates of its associated example points. After all of the examples have been processed, the standard points with high counts represent event sequences which are highly associated with the class. The coordinates of the standard points represent the relative centers of regions with respect to the first event in the sequence. The size and shapes of the regions can be determined by the variation of the associated example sequences. In some embodiments of the invention, it may be desirable to merge similar sequences. Candidates for merger are easily determined by their distance in projected hyperspace.

In some embodiments of the invention, the process finds combinations of regions which detect sequences of events which are seen to frequently co-occur with the target class. The utility of these as weak detectors depends on the co-occurrence being less frequent when the target class is not present.

The process described herein involves a process for discovering event sequences which provide affirmative evidence of the positive class. Contravening evidence is also valuable. To discover contravening evidence, the process described above is repeated but this time with the negative examples. Inhibitory weak detectors are formed based on sequences which recur in the negative examples with some frequency, but never or rarely occur in the positive examples.

In some embodiments of the invention, ensembles of weak detectors may be formed by using an adaptive boosting algorithm to handle unbalanced training sets or to result in lower complexity detectors.

Performance Improvement by Simplifying Boosted Ensembles

In some embodiments of the invention, adaptive boosting algorithms are used to increase recognition performance. Adaptive boosting algorithms involve a reiterative process of sequentially calling weak classifiers, testing those classifiers, and adjusting the weighting coefficients accordingly. Adaptive boosting algorithms create ensembles by adding one weak detector per iteration with no look-ahead and no correction of prior weights. As a result, the final ensemble may be more complex than necessary.

Some embodiments of the invention include a process to reduce the complexity of ensembles created by adaptive boosting algorithms. According to these embodiments, after the detector achieves perfection on the training set or reaches a maximum number of rounds, then a simplification process is performed. The performance of the composite detector is iteratively compared with versions of itself which each have a different one of its weak detectors removed. If removing any of the weak detectors improves the error rate, the removal which makes the most improvement is performed, otherwise, if removing any of the weak detectors causes no increase in the error rate, one such weak detector is removed. The process continues until no more weak detectors are removed.

In some other embodiments of the invention, a linear programming boosting algorithm updates all of the weights of the ensemble as new detectors are added is used for ensemble construction.

Alternative Cue Detection

Human speech perception can rely on alternate cues when some aspects of the speech signal are corrupted. Likewise, alternative cues can be found in a speech sample and detected in an automatic speech recognition system.

In some embodiments of the invention, detectors based on alternate cues are developed by following the steps mentioned above to create an ensemble detector and then repeating the process to make subsequent detectors with the constraint that weak detectors used by previously created detectors may not be used to construct subsequent detectors. This will maximize the independence of the detectors. Multiple alternative cue detectors can then be combined as an ensemble to make a detector which is tolerant of such variation.

Automatic Conversion of Ensembles to Cascading Detectors

The overall decision of the ensemble is the weighted sum of the individual detectors. In the ensemble's standard form, all of the weak classifiers must be evaluated to make a speech determination. In some embodiments of the invention, the detector ensemble is converted to a cascading detector which reduces the number of weak detectors which must be evaluated on average. By ordering the weak detectors from strongest to weakest and analyzing the relationship between the sums at each stage and the final outcome, "early out" thresholds can be established which convert the ensemble to a detector cascade.

The relative timing of various events contains information important for speech perception. This type of information can be exploited by examining the persistent patterns of corresponding events from multiple examples of a given word, syllable, phoneme, etc. This analysis is challenging because of the variability in every aspect of speech and the fact that different perceptive cues occur over different time scales.

However, as explained herein, most machine learning classification techniques are designed to learn decisions based on fixed length vectors of homogenous information. With event based extraction, events occur or not according to signal conditions. This means that a given example may have more or fewer events than another example of the same syllable, word, phoneme, etc. In order to effectively train detectors using event based extraction, it is necessary to discover which events from one example of a syllable, word, phoneme, etc., correspond to the same perceptive support in other examples. Later in this document, methods are described which automatically locate the bounds of these corresponding events.

Methods and Techniques to Automatically Use Training Examples to Discover Relevant Supporting and Contravening Information and Determining Weightings to Make a Detection Decision Event-Based Cascades for Highly Unbalanced Training Sets In some embodiments of the invention, a method of automatically creating event-based detector cascades overcomes the problems of learning from highly unbalanced training sets or learning to detect rare objects. The resulting detector cascades provide efficient detection of rare objects by elimination of the majority of negative examples in the early stages.

In some embodiments of the invention, creating event-based detector cascades involves creating detectors for specific words which rarely occur. Detecting rare words is simply used to illustrate the invention and other detection applications will be readily apparent to those with ordinary skill in the art having the benefit of this disclosure. For example, some other techniques include detection of sub-word speech classes, such as specific syllables, specific phonemes, broad syllable classes, and broad phonetic classes. In addition, the invention may be applied to many applications which are not related to speech recognition such as industrial process monitoring, automotive system fault detection, and medical equipment monitoring.

Highly unbalanced training sets with few positive examples and many negative examples are not handled well by machine learning techniques which attempt to minimize the total number of errors. When positive examples rarely occur, for instance with a rate of 1 in 100,000,000 then a detector which fails to detect this occurrence would have a very low error rate (error rate=0.00000001). However, even though it has a low error rate because it never makes a false detect, it is essentially useless.

Objects which are members of a class share characteristics whose values fall within certain ranges. Thus, objects with characteristics whose values fall outside of those ranges may be wholly rejected for not belonging to the class. However, objects having characteristic whose values are not completely within the range may have some characteristics whose values fall in the range associated with the class. Therefore, it may be possible to rule out class membership for an object if it has a single out-of-range feature value. Indeed, in some embodiments of the invention, confirming class membership generally requires all relevant feature values to be in ranges consistent with the class.

Applied to speech recognition, event based feature extraction creates a sparse representation which preserves the information most relevant to recognition of speech classes including the temporal information. One example of a type of event which may be extracted is the occurrence of a peak in the envelope of a certain feature trajectory. A feature trajectory envelope may, for instance, be computed on the output produced when the speech signal is passed through a certain band-pass filter. When many such trajectories are computed, the events are distributed in time-trajectory space. All evidence useful for word class identity is associated with events in time-trajectory space. When event times are made relative to a common time reference, such as the syllable centers, and the events from multiple examples of the same class are plotted in time-trajectory space, regions containing clusters of related events are formed.

The locations, shape, and scale of these cluster-containing regions are specific to the class. Some of these regions will be so strongly associated with the class that all positive examples of the class will have events which fall in the region. As explained above, an object which does not have an event within such a region may be rejected as being a member of the class. A multitude of feature values may be associated with each event. The ranges of values for each of the features associated with events from positive class examples within a region form intervals in additional dimensions of space. An object must have an event with associated values within the range of every relevant feature dimension to be accepted as a class member. The characteristics which distinguish one non-class object from all of the objects of the class may be different from the characteristics which distinguish another non-class object from all of the objects of the class.

Figure 4:
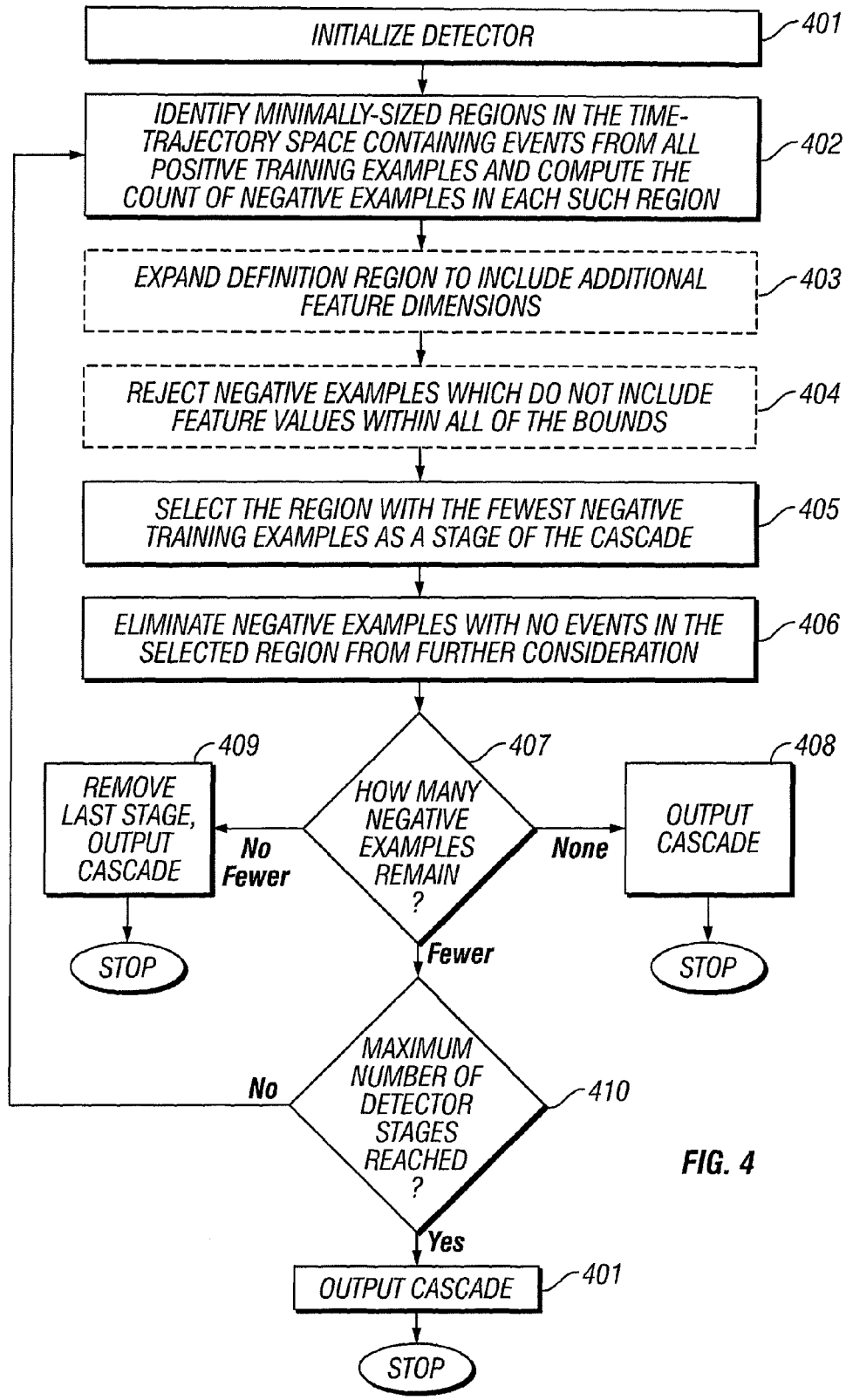
FIG. 4 illustrates a workflow 400 for creating a detector cascade according to some embodiments of the invention.

According to some embodiments of the invention, these relevant considerations may be automatically discovered to create a detector. FIG. 4 illustrates a workflow 400 for creating a detector cascade according to some embodiments of the invention.

The workflow 400 begins by initializing the detector cascade to contain zero detector stages 401. Next, all regions in the time-trajectory space which contain events from all positive training examples are identified and the number of negative examples having events within each identified region is computed 402.

Next, for each region which contains events from all positive training examples, the definition of regions may optionally be expanded to include additional feature dimensions 403. The bounds of the region for any additional dimensions are selected such that they include the full range of values of the positive examples. Next, negative examples which do not include feature values within all of the bounds, so established, are rejected, and the count of negative examples included in the region is reduced accordingly 404. The additional dimensions, if any, are chosen to minimize the count of included negative examples given the number of dimensions. This means the feature dimensions used for different regions are those which discriminate best and may vary from region to region.

Next, the region in the list which contains events from the fewest negative training examples is selected as a detector cascade stage 405. In some embodiments of the invention, a maximum number of detector stages are predetermined. Further, negative examples with no events in the selected region are eliminated from further consideration 406.

Next, the workflow makes query about how many negative examples remain 407. If there are no negative examples remaining, a detector cascade has been created which performs perfectly on the training examples; the workflow 400 outputs the detector 408 and stops.

If there are no fewer negative examples than in the previous iteration then no further improvement can be made. In this case, the workflow 400 removes the stage just added, writes out the imperfect detector 409, and stops.

Conversely, if there are fewer negative examples than in the previous iteration, then the workflow queries whether the maximum number of detector stages has been added 410. If the maximum number of detector stages has been added to the cascade, then the workflow 400 outputs an imperfect detector 411 and stops.

If there are remaining negative examples and if the maximum number of detector stages has not been reached, then the workflow 400 reiterates and continues to build the detector cascade by adding additional stages by reverting to step 402

After the detector cascades are created they are used according to the following method. First, events are detected and given a common reference as they were during the training process. Next, starting at the first stage of the cascade, the events in the list are evaluated to determine if any are inside the region. If any events are found to be inside the region, the events in the list are evaluated by subsequent stages as long as at least one event is found to be inside the region used by that stage.

Next, if the object has events inside the regions of all of the stages of the cascade, the object is detected as a member of the class. Finally, if the object does not have events in any one of the stages, it is rejected as a member of the class by that stage and no further processing is performed.

In these examples, axis-aligned (hyper-) rectangular regions were utilized. In some other embodiments of the invention, other boundary configurations are used, such as (hyper-) spheres, or (hyper-) ellipses, or mixtures of boundary shapes in different regions or in different dimensions. Furthermore, (hyper-) rectangular regions which are not axis aligned may be used. This observation applies to all weak detector references.

Figure 5:
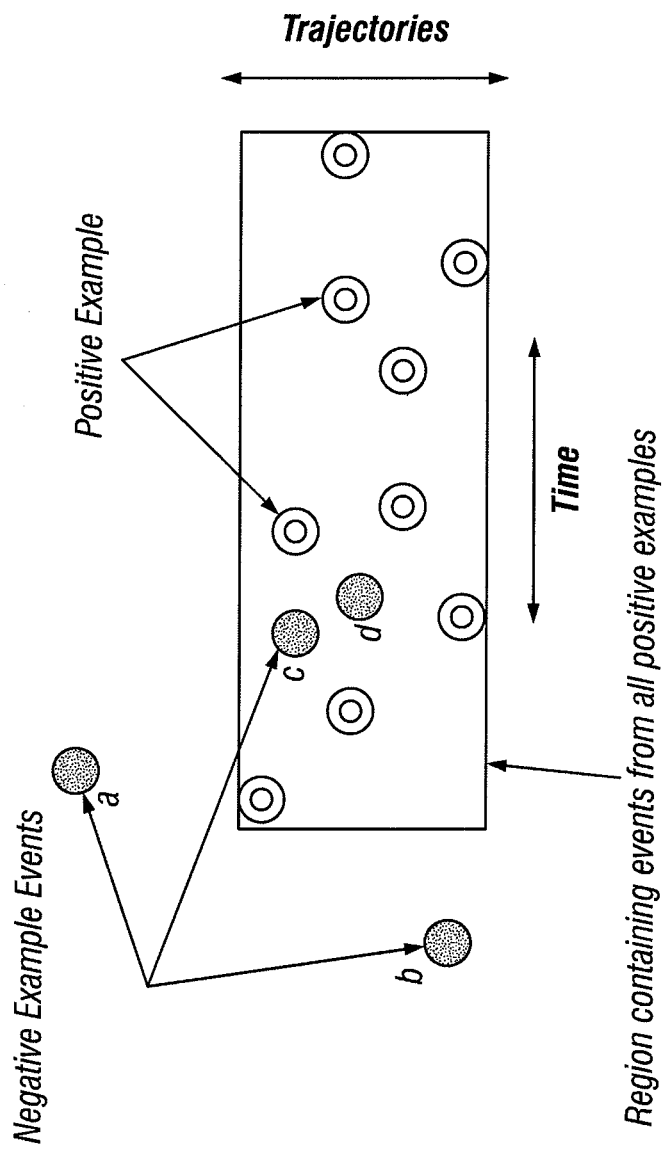
FIG. 5 illustrates an example of a region containing events from all positive examples according to some embodiments of the invention.
Figure 6A:
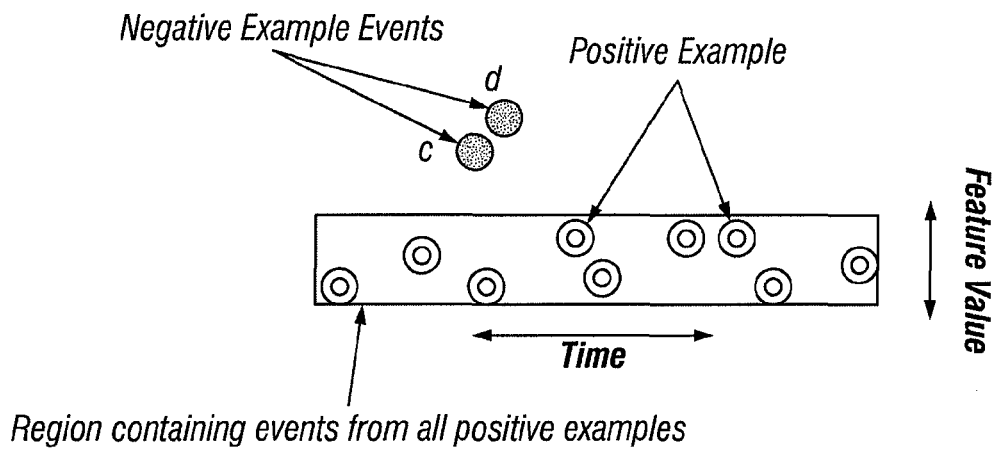
FIG. 6A illustrates another example of a region in time feature space containing events from all positive examples according to some embodiments of the invention.
Figure 6B:
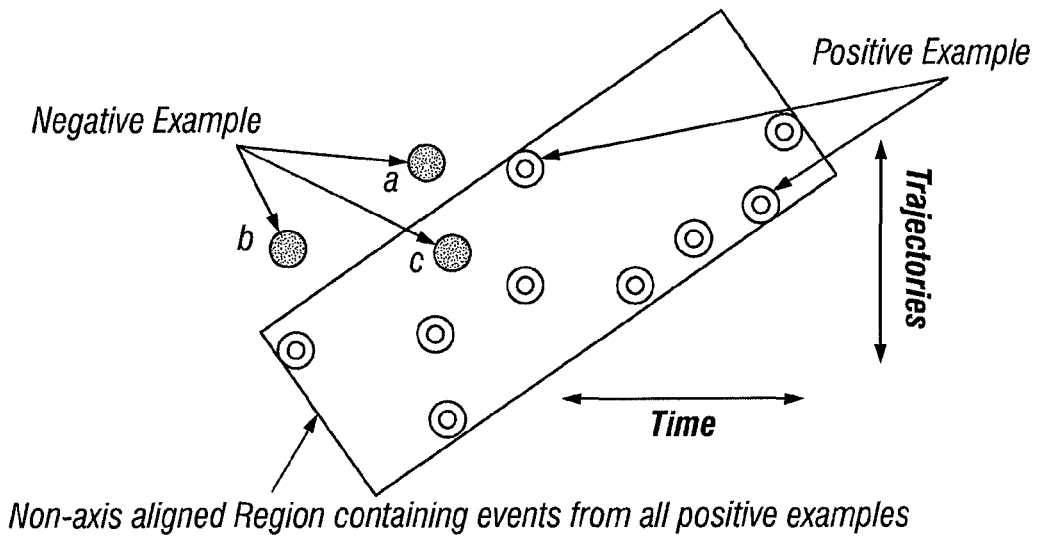
FIG. 6B illustrates a non-aligned region containing events from all positive examples according to some embodiments of the invention.
Figure 6C:
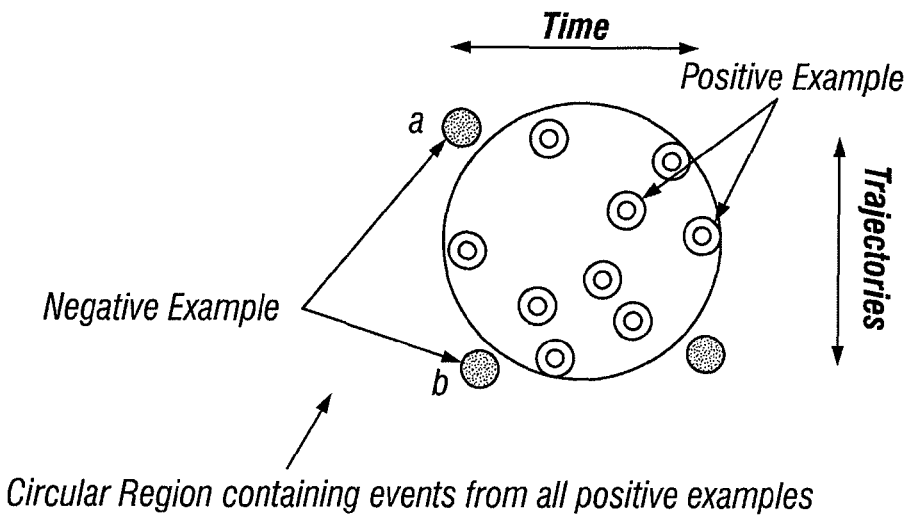
FIG. 6C illustrates an example of a non-rectangular region containing events from all positive examples according to some embodiments of the invention.

FIGS. 5-6C illustrates various examples of projections of training example events on a time-feature value plane according to some embodiments of the invention. FIG. 5 illustrates an example of a region containing events from all positive examples. FIG. 6A illustrates another example of a region containing events from all positive examples. FIG. 6B illustrates a non-aligned region containing events from all positive examples. FIG. 6C illustrates an example of a non-rectangular region containing events from all positive examples.

Improving Generalization by Maximizing Geometric Margin

The method used to identify regions in the time-trajectory plane results in boundaries which are tightly fitted around the positive training example events contained in the region. When used as a detector such tightly fitted boundaries would reject cases with values which are only slightly different from the training example events at the outer bounds of the region. If the boundaries are expanded as much as possible without enclosing additional negative example events, the detector will be able to detect cases with values similar to, but beyond the range of values of any of the positive training examples in the region. However, these maximally loose boundaries can cause false detections of cases with values which are only slightly different from values of the negative example events which limit the boundaries.

Figure 7:
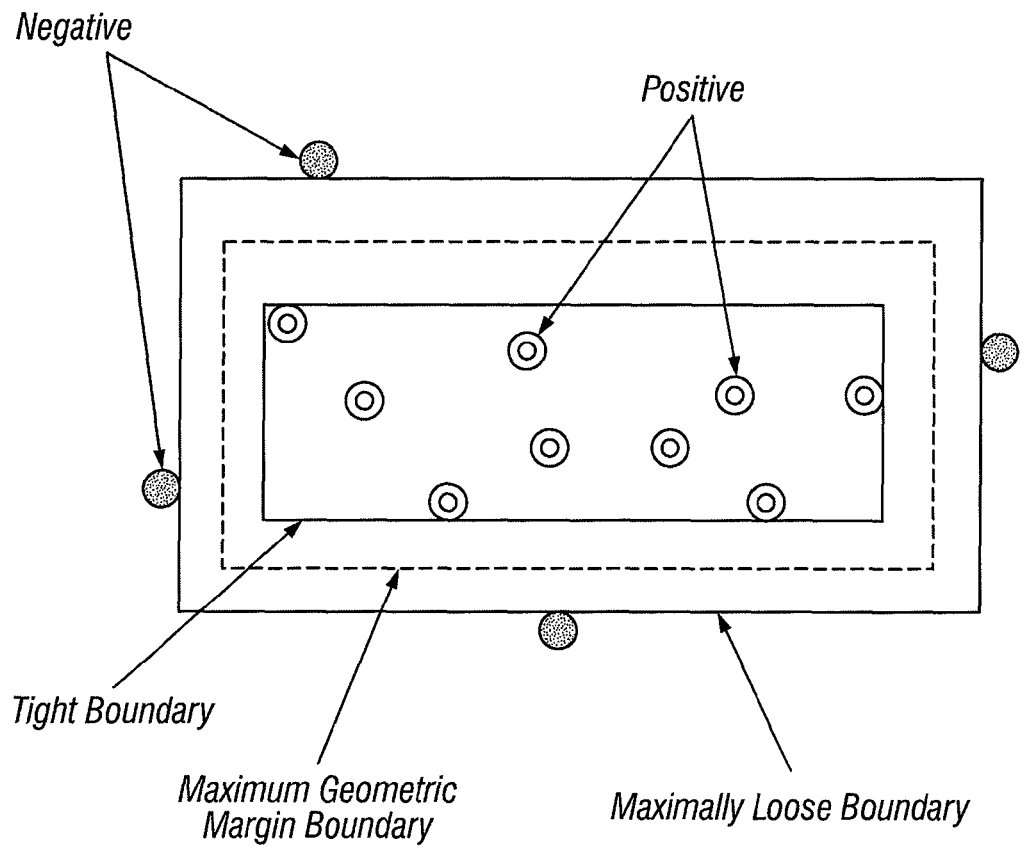
FIG. 7 illustrates the relationship of the maximum geometric boundary to the maximally tight and maximally loose boundaries in one projection of a region according to some embodiments of the invention.

Generalization may be improved by adjusting each of the bounds in the region to maximize the geometric margin between detected positive example events and rejected negative example events. The maximum geometric margin boundaries are halfway between the tight minimal boundaries and the loose maximal boundaries. Maximizing the geometric margins allows the best chance for generalization to cases unseen in the training examples. FIG. 7 illustrates the relationship of the maximum geometric boundary to the maximally tight and maximally loose boundaries in one projection of a region.

The Use of Sequences of Reliable General Categories to Constrain Perceptions

Typical automatic speech recognition systems work by recognizing details, such as phonemes or sub-phoneme classes, and using those details to determine higher level patterns, such as words. These low level details are not distinguished with certainty; instead probability estimates are made for each of the classes given an observation vector of feature values. Hidden Markov Models (HMM) use the class probability estimates along with transition probabilities to compute the most likely sequence of intended speech sounds. While the approach of "building up from the details" is popular and fairly effective, it does not result in automatic speech recognition systems rivaling human performance. One of the drawbacks of this approach is the fact that detailed classifications are not very reliable and must be fixed up by applying higher levels of context. Furthermore, detailed classifications are highly context dependent but the context is not known when determining the identity of the speech classes. In addition, the context may be represented inaccurately or with low confidence. Moreover, accurate statistics are difficult to estimate for details in contexts which rarely occur. Variations in the acoustical conditions or the manner of speech which are not represented in the statistical distributions of the model cause the statistical estimates to become very inaccurate. Finally, the large search space of alternate solutions may be computationally intractable. Typically the search is reduced by arbitrary means such as retaining only the 'n' most likely. The objects of the present invention are to overcome the problems and limitations inherent in the common approach.

In general, classification into broad categories can be performed more reliably than classification into detailed categories. For example, distinguishing between a fish and a bird can be done more reliably than determining the specific types of birds or fish. Likewise, in the case of speech recognition broad categorization can be performed more accurately than detailed categorization.

Additionally, human perception seems to operate mainly on broad categorizations and consider details only when there is a reason to focus on them. In fluent continuous speech, words are only rarely produced as a dictionary says they should be, but this causes human listeners few problems as long as sufficient evidence to support a perception is present. Indeed, human listeners can tolerate substitutions and omissions as long as the aspects of the speech fall into expected reliable broad categories generally following the expecting timing of speech.

For example, consider the question and response: "Why you cryin?"; "See hit me! The question omitted the word "are" and substituted the syllable 'in' for 'ing'. Neither of these changes have much effect on human perception. Likewise, the answer would most likely be perceived as "She hit me!" even though the required 'sh' sound has become the similar sounding 's'. The substitution and omission of details in these examples has little effect on perception and probably would go unnoticed by a human. It seems that the patterns of sequences of broad syllable categories are sufficient to index perceptual units which in many cases lead to an unambiguous perception without requiring specific identification of detailed classes.

The invention is based on the following observations:

- To a great extent, the sequence pattern of broad speech categories can limit the possible perceptual alternatives. The perceptual alternatives form a perceptual cluster.
- The sequence of broad speech categories itself can be used to directly access the list of perceptual alternatives.
- Further computational effort is only applied as necessary to disambiguate between the remaining alternatives within a perceptual cluster.
- Because the alternatives in the cluster are known at training time, for each perceptual cluster the process of disambiguation can be optimized for maximum reliability or minimal computational effort. Consequently, the most reliable distinctions in any circumstance can be applied. This means that information from various sources may be applied, including, word statistics, prosodics, grammar, etc.
- When disambiguating between alternate perceptions, the phonetic and word contexts of the alternatives are known, thereby limiting the computations of distinguishing features to those which are relevant and most reliable. Moreover, context specific detectors and classifiers can be used for higher reliability.

According to these embodiments, it is only when the sequence patterns of broad categories does not completely disambiguate the perception, that an appeal to detail is required. Even then it is possible to preferentially use detailed discriminations which are known to be more reliably made than other detailed discriminations. For example, consider a sequence pattern of broad syllable categories indexed to two possible perceptions which were distinguishable from one another by different phonemes at two locations. If one of the phoneme pairs were known to be more reliably distinguished than the other, the distinction would be made on the more reliable classification.

Likewise, context is very important to perception. If the answer in the example given earlier had been "cuz see hit me!", it might be perceived as "cause, he hit me!". The details of segment 'see' have not changed but the perception does not depend on the details of that segment.

In some embodiments of the invention, a unique algorithm is used to classify speech into perceptual clusters and disambiguate between alternative perceptions by optimally accessing available information. According to these embodiments, at each time step (i.e. arrival of another syllable pattern or null syllable if no speech occurs within a certain duration), the algorithm classifies the speech into a sequence of broad but reliable patterns, such as broad syllable categories. Next, each broad category is associated with a category number. Preferentially, similar categories are assigned similar numbers.

Next, the algorithm maps sequences of broad categories into perception patterns by using the category numbers as coordinates in state space. Each point in state space is associated with a perceptual cluster and a disambiguation strategy. The disambiguation strategy, established during training, is a sequence of steps to be performed when the perceptual cluster is accessed. The purpose of the disambiguation strategy is to disambiguate between alternate perceptions to optimally access available information. The disambiguation strategy is determined by evaluating the computational requirements and success of various disambiguation techniques applied in different orders and in different combinations. The end result of applying the strategy is a reduction of the alternative perceptions to a small number, preferably one.

If the alternatives are reduced to a single perception, the perception is acted upon. In a speech-to-text system this would involve outputting the words corresponding to the perception. In a speech controlled system, the actions associated with the perception would be executed.

If the alternatives are not reduced to a single perception and a maximum latency threshold has been reached, the most likely perception is accepted as the perception and actions are generated accordingly. If the maximum latency threshold has not been reached the possible remaining alternative perceptions are retained and interact with subsequent time steps to both aid in disambiguation of the perceptions at those time steps and be disambiguated by information available in those time steps.

Automatic Speech Recognition Engine

In the presently preferred embodiments of the invention, an apparatus is provided for carrying out all of the novel aspects of the invention. In the presently preferred embodiments of the invention, the automatic speech recognition system is used in real-time television closed-captioning and word spotting environments.

Figure 8A:
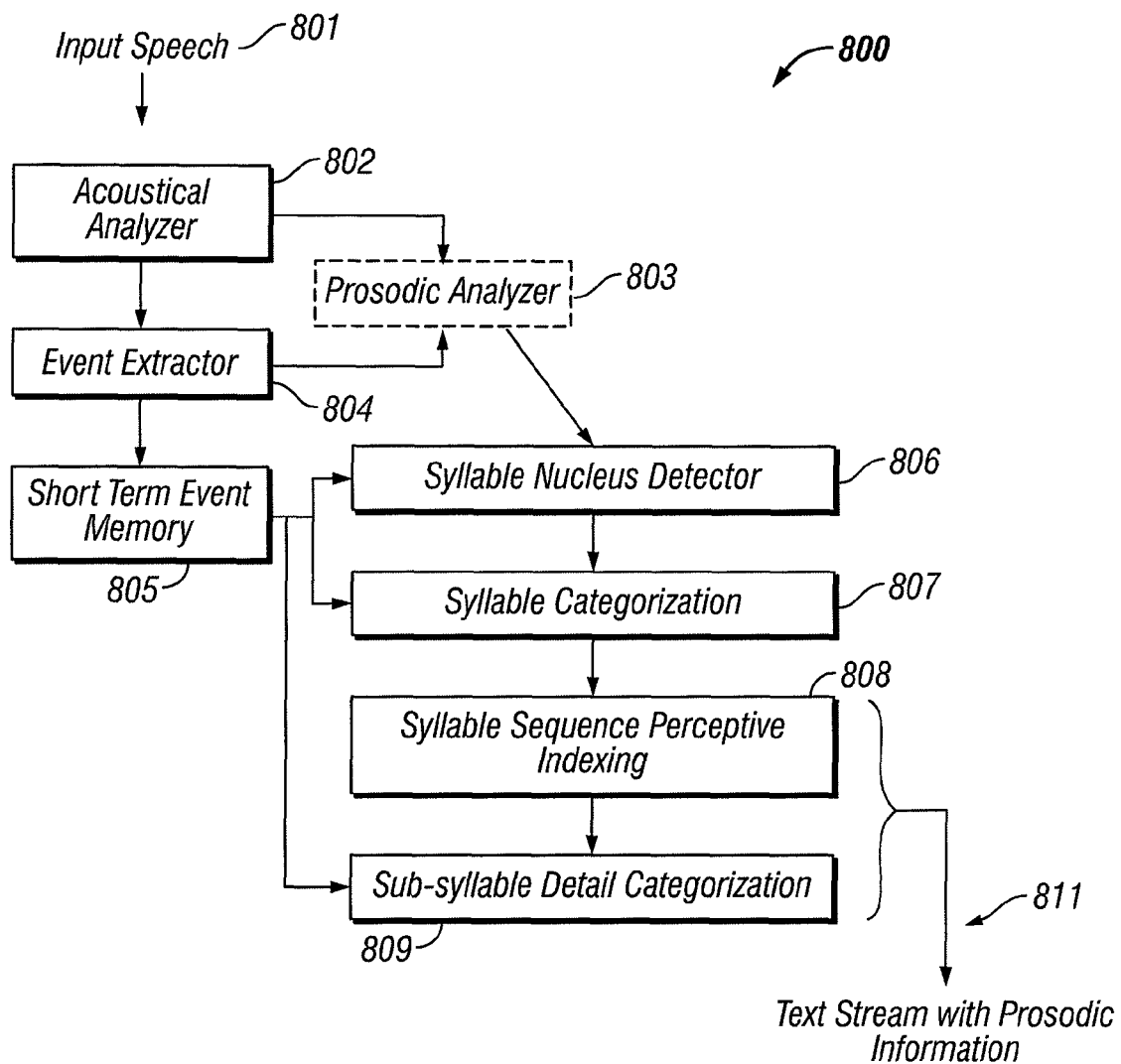
FIG. 8A illustrates a representation of an automatic speech to text system according to some embodiments of the invention.

FIG. 8A illustrates a representation of an automatic speech to text system 800 which comprises event based extraction and recognition at a syllable scale of broad syllable classifications. The automatic speech to text system 800 uses patterns of sequences of broad syllable classifications to index into lists of perceptual units with reference to phoneme level detail only as needed for disambiguation. In the presently preferred embodiments of the invention, the automatic speech to text system 800 chooses which phoneme classifications to make or chooses other methods of disambiguation to employ based on reliability of those classifications or methods.

The automatic speech to text system 800 includes an acoustical analyzer 802. The acoustical analyzer receives an input speech signal 801 and digitizes said input signal 801. The acoustical analyzer 802 is optionally coupled with a prosodic analyzer 803 and with an event extractor 804. In some embodiments of the invention, the digitized signal is processed by the prosodic analyzer 803, thereby extracting various linguistic characteristics of the speaker including, but not limited to rhythm, stress, intonation, or other prosody information reflective of: the emotional state of the speaker; whether the utterance is a statement, questions, or command; irony; sarcasm; emphasis; focus; et cetera. According to these embodiments, the prosodic information and the digitized signal are sent to the event extractor 804.

The event extractor 804 comprises a processing engine for automatically identifying regions in a plurality of speech signals that contain event patterns and extracting said events for speech recognition. In the presently preferred embodiments of the invention, the processes and methods disclosed above for event recognition and extraction are employed by the event extractor 804. The event extractor 804 is coupled with a short term event memory 805 for storing the extracted speech events. The short term event memory 805 is coupled with a plurality of event-to-text stream processing modules for using the extracted events to output a resultant text stream. In the presently preferred embodiments of the invention, the event-to-text stream processing modules comprise a syllable nucleus detector 806, a syllable categorizer 807, a syllable sequence perceptive indexing module 808, and a sub-syllable detail categorization module 809. The event-to-text stream processing modules output a text stream with added prosodic information 811 embedded therein.

The automatic speech to text system 800 shown in FIG. 8A comprises one example of an apparatus for automatic speech recognition and for improving the same. It will be readily apparent to those with ordinary skill in the art having the benefit of this disclosure that any number of systems, configurations, hardware components, etc. can be used to carry out these methods and processes for automatic speech recognition and for improving the same.

Figure 8B:
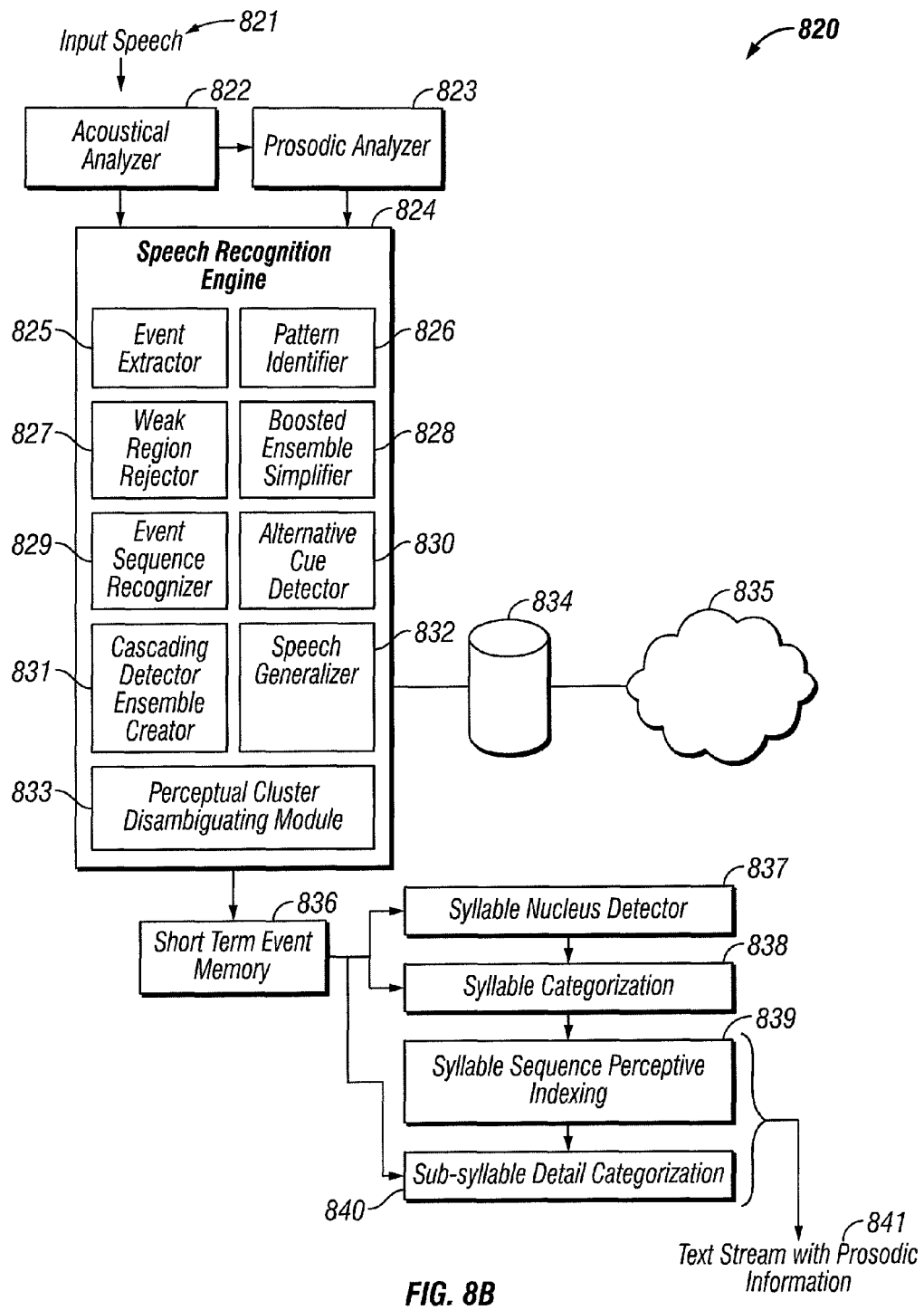
FIG. 8B illustrates a representation of an automatic speech to text system according to some embodiments of the invention.

FIG. 8B illustrates a representation of an automatic speech to text system 820 which comprises a speech recognition engine 824 for processing an input speech signal 821 according to some embodiments of the invention. In the presently preferred embodiments of the invention, an acoustical analyzer 822 receives the input speech signal 821 and digitizes said input speech signal 821. The acoustical analyzer 822 is coupled with a prosodic analyzer 823 and with a speech recognition engine 824. In some embodiments of the invention, the digitized signal is processed by the prosodic analyzer 823, thereby extracting prosody information, as explained above.

In the presently preferred embodiments of the invention, the speech recognition engine 824 comprises a plurality of processing modules for performing various speech recognition processing steps. As shown, the speech recognition processing engine 824 comprises: an event extractor 825; a pattern identifier 826; a weak region rejecter 827; a boosted ensemble simplifier 828; an event sequence recognizer 829; an alternative cue detector 830; a cascading detector ensemble creator 831; a speech generalizer 832; and a perceptual cluster disambiguating module 833. Although specific processing modules are listed herein, it will be readily apparent to those with ordinary skill in the art having the benefit of this disclosure that any speech recognition tools, now known or later developed, can be embodied as a processing module in the speech recognition engine 824.

In some embodiments of the invention, the event extractor 825 comprises an event-based speech recognition module for constructing a scheme of weighted classifiers for use in speech recognition engine 824. In some embodiments of the invention, the pattern identifier 826 automatically identifies regions in a plurality of speech signals that contain event patterns. In some embodiments of the invention, the weak region rejecter 827 employed several techniques to reject regions which are unlikely to result in robust weak detectors. In some embodiments of the invention, the boosted ensemble simplifier 828 reduces the complexity of detector ensembles created by adaptive boosting algorithms. In some embodiments of the invention, the event sequence recognizer 829 detects sequences of events instead of, or in addition to, detecting individual events. In some embodiments of the invention, the alternative cue detector 830 recognizes alternative speech cues when aspects of the speech signal are corrupted. In some embodiments of the invention, the cascading detector ensemble creator 831 automatically creates ensembles of detectors. In some embodiments of the invention, the speech generalizer 832 improves generalization by maximizing geometric margin, as explained above. In some embodiments of the invention, the perceptual cluster disambiguating module 833 disambiguates speech using perceptual clustering, as explained above. According to these embodiments of the invention, the speech recognition engine 824 outputs speech data.

In some embodiments of the invention, the recognized speech data is stored in one or more database 834, wherein the one or more database 834 is preferably coupled with a network 835. In some other embodiments of the invention, the recognized speech data is automatically sent to a short term event memory 836 for speech to text processing.

In some embodiments of the invention, the short term event memory 836 is coupled with plurality of event-to-text stream processing modules for using the extracted events to output a resultant text stream. In the presently preferred embodiments of the invention, the event-to-text stream processing modules comprise a syllable nucleus detector 837, a syllable categorizer 838, a syllable sequence perceptive indexing module 839, and a sub-syllable detail categorization module 840. The event-to-text stream processing modules output a text stream with added prosodic information 841 embedded therein.

Figure 8C:
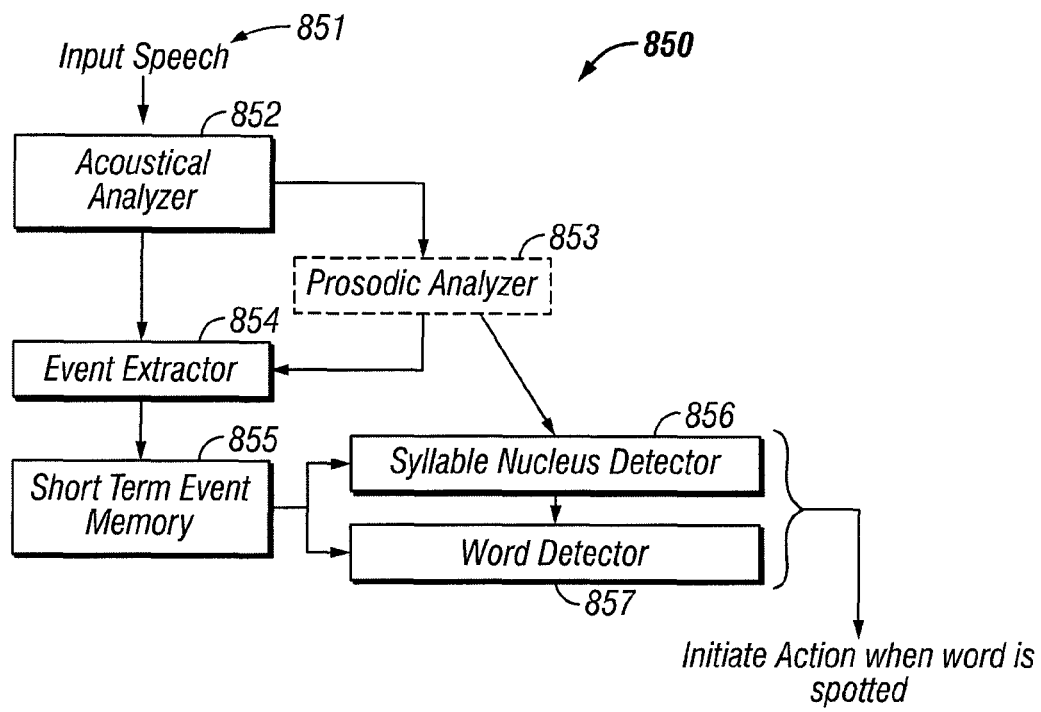
FIG. 8C illustrates a representation of a system for event recognition and word spotting according to some embodiments of the invention.

In some other embodiments of the invention, an apparatus is provided for extracting event data from a speech signal and spotting words therein. FIG. 8C illustrates a representation of a system 850 for event recognition and word spotting which comprises event based extraction and recognition of specific words. The automatic speech to text system 850 includes an acoustical analyzer 852 for receiving an input speech signal 851. The acoustical analyzer 852 is optionally coupled with a prosodic analyzer 853 and with an event extractor 854. The event extractor 854 comprises a processing engine for automatically identifying regions in a plurality of speech signals that contain event patterns and extracting said events for word spotting. The event extractor 854 is coupled with a short term event memory 855 for storing the extracted speech events. The short term event memory 855 is coupled with a plurality of word-spotting processing modules. In some embodiments of the invention, the word-spotting processing modules comprise a syllable nucleus detector 856 and a word detector 857. The word-spotting processing modules initiate one or more actions when a word is spotted.

The second processing module 862 comprises a spiking neural net classifier. Information used for speech perception is non-uniformly distributed in frequency, amplitude, and time. Temporal patterns are very important to speech recognition. The spiking neural networks allow coding of speech information in temporal patterns of spikes and fuzzy memory structures allow tolerance of temporal variability. The third processing module 863 comprises one or more tandem speech recognition engine, as explained below.

The alternative speech-to-text system 860 also includes a acoustic analyzer 866 for analyzing and digitizing input speech signals 867. The digitized speech signals are processed by one or more of the three processing modules 861, 862, or 863, and the results are fed to a decision module 868, which chooses the best-recognized results and delivers a text output 869.

Some embodiments of the invention involve segmenting a speech signal at perceptually important locations. This provides a means to extract not only perceptually relevant timings, but also to synchronize the analysis of the signal with speech events, thus avoiding all of the problems of asynchronous fixed frame analysis, as discussed above.

The method first performs a pre-segmentation filter using low complexity filters which are based on certain aspects of human perception and the speech phenomena that they are intended to detect. These filters detect the locations of perceivable patterns indicative of speech onsets, closures, bursts, glottal pulses, and other significant speech signal events.

The pre-segmentation event filtering defines intervals which are used to synchronize certain feature computations. The patterns of features which have been synchronously extracted are further processed to create features over longer time scales and to detect still higher level perceptual events such as phoneme boundaries, syllable nuclei, etc.

Figure 9:
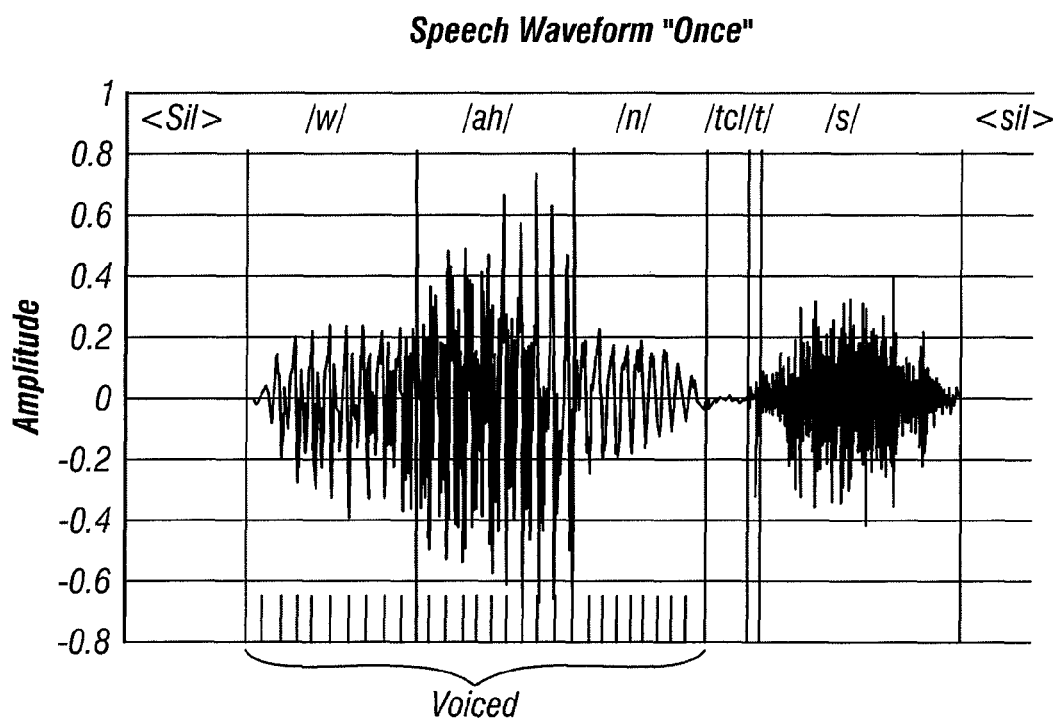
FIG. 9 illustrate an example of segmentations of a speech signal according to some embodiments of the invention.

FIG. 9 illustrate an example of segmentations of a speech signal according to some embodiments of the invention. The speech signal of FIG. 9 contains the utterance "Once". The signal changes character several times over the course of the utterance in ways that are visually apparent when viewing the waveform. The segmentations indicated by short vertical marks at the bottom of the graph correspond to glottal pulse events during the "voiced" portion of the word.

The long vertical lines correspond to various types of speech sound boundary events. For reference, segment labels have been placed on the graph indicating the phonetic identity of the segment. The signal conditions at the transitions between phonemes vary by the type of transition. At some boundaries the total energy changes abruptly, while for others spectral changes are associated with the event. Taken altogether, these various events enable feature extraction to be performed synchronously with the speech events and provide perceptually relevant segmentation.

In some embodiments of the invention, signal segmentation is based on perceptual differences present in the speech signal. Oftentimes, the information used for speech perception is not uniformly distributed in time. Human perception is sensitive to changes in stimuli. In temporal signals such as speech, the time locations of significant changes (i.e. events), provide for the perceptual organization of the signal. The relative timing of events and the characteristics of the stimuli in their neighborhood encode much of the perceptual information. In general, magnitude perceptions are non-linear. For example, the perception of sound intensity is known to be logarithmic and is commonly measured in decibels. It can be demonstrated that, for a wide range of perceptions, the just-noticeable-difference in stimulus is related to the original level of the stimulus. However, this does not hold at the extremes and there is no perception at the low end until the level of stimulus reaches a minimum level for neural activation. At the high end, once neurons begin to saturate, further increases in stimulation are not perceived. In the operational range, for many types of stimuli, the change needed for a perceptual response can be approximated by Weber's law: $K=\Delta I/I_o$; where $I_o$ is the original stimulus level, $\Delta I$ is the change in stimulus level, and K is empirically determined constant defining the threshold of just-noticeable-difference.

The right-hand side of the Weber's law formulation may be recognized as contrast. In the present invention, events are declared (i.e. the detectors fire) when the change in a relevant characteristic exceeds a perceptual threshold. In the present invention, the perceptual change is computed using a perceptual contrast calculation related to Weber's law.

FIG. 10 illustrates a perceptual contrast formula used to compute perceptual change according to some embodiments of the invention. In this formula, the denominator of the ratio on the right side differs from the standard Weber's law formulation in two ways: it includes the sum of the values being contrasted and it includes an additional factor $\epsilon$. The factor $\epsilon$ inhibits activation at very low levels to better mimic the perceptual response to very low level stimuli. It also makes the formula numerically stable by avoiding a division by zero when no stimulus is present.

The inclusion of the sum of the contrasting values further flattens the perceptual contrast response at very low and very high levels. For each measured perceptual characteristic, (e.g. energy or frequency), appropriate values of $\epsilon$ and perceptual thresholds are established empirically. In some embodiments of the invention, a plurality of heterogeneous perceptual event detectors are created, each being based on some particular signal characteristic, measured on some particular time scale, and with its own particular $\epsilon$ and perceptual thresholds.

The event detectors of the invention operate on various aspects of the signal at various scales. First, pre-segmentation is performed by processing energy values through low complexity filters which detect the temporal locations of bursts, closures, and glottal pulses. Feature extraction is then performed relative to the pre-segmentation events. Additional filters and detectors are applied to the synchronously extracted features to extract higher level features and events.

Additional Feature Extraction and Processing Techniques
Sectioned Circular Queue Memory Several components of the event detectors involve comparisons of sums of feature values computed using analysis windows of various lengths, aligned in specific temporal relationships with respect to each other. To minimize the computational burden of the event detectors these sums are maintained using a sectioned circular queue memory. A circular queue is a first-in-first-out (FIFO) memory structure where new information is written into the memory at $I_o$, the index of the oldest information in the memory. After writing the new information into the memory, the index $I_o$ is advanced modulo the length of the memory (i.e. the index $I_o$ wraps around to zero when it gets to the end of the memory). Running sums of the values in the memory can be maintained as according to the process set forth below.

First, initialize the circular queue memory locations, the running sum, and the index Io to zero. Next, at each time step: subtract the indexed value from the running sum; add the new value to the running sum; write the new value into the circular queue; and advance the index $I_o$ modulo the length of the memory.

The operation of a circular queue and its usefulness for the efficient computation of running sums is illustrated in FIGS. 11A-11C. FIG. 11A illustrates a circular queue memory according to some embodiments of the invention. In FIG. 11A, a 5-element circular queue memory is depicted at time "t" when a new value, "7", is to be remembered. The new value will overwrite the oldest in memory which, in the illustrated example, has a value "9". Prior to remembering the new value, the sum of the values in the example memory is 25. Because the new value overwrites the oldest value, the running sum can be maintained by subtracting the oldest value and adding the new value. As can be readily seen, the computational complexity of maintaining running sums in this manner is independent of the length of the memory. Only one subtraction and one addition are required regardless of memory length.

FIG. 11B and FIG. 11C illustrate an updated circular queue memory according to some embodiments of the invention. More specifically, FIG. 11B and FIG. 11C show the update process continuing through the next two time steps. To maintain multiple running sums of values over various subsections of the memory, the circular queue is sectioned by using additional indices, each of which has a fixed offset from the index $I_o$. Each sub-section's running sum is maintained by simply subtracting the value which is about to move out of the sub-section and adding the value which is about to become part of the sub-section.

Figure 12:
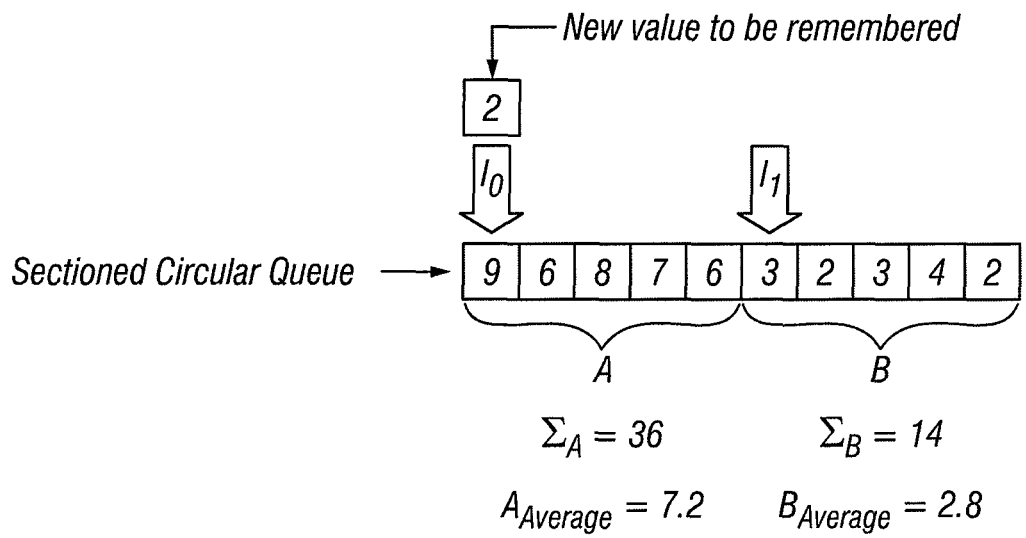
FIG. 12 illustrates shows a sectioned circular queue for maintaining two running sums according to some embodiments of the invention.

FIG. 12 illustrates a sectioned circular queue for maintaining two running sums according to some embodiments of the invention. The sectioned circular queue is arranged to facilitate the maintenance of two running sums, one computed for the oldest half of the values in the circular queue (i.e. sub-section A) and the other computed for the most recent half of the values in the circular queue (i.e. sub-section B). These sums are referred to as $\Sigma_A$ and $\Sigma_B$ respectively. Now there is a second index $I_1$ maintained at an offset equal to one half of the length of the memory from the index, $I_0$. At each time step the value indexed by $I_0$ (i.e. the oldest value in the entire memory) is subtracted from $\Sigma_A$ and the value indexed by is added to the $\Sigma_A$, while the value indexed by $I_1$ is subtracted from the $\Sigma_B$ and the new value to be written into the memory is added to the $\Sigma_B$. The new value is written to the location at index $I_0$, and the indices $I_0$ and $I_1$ are both then incremented modulo the length of the memory. In the example just given, the sub-sections of the memory are of equal size, form disjoint sets, and together cover the entire memory. None of these conditions are required by the method.

Figure 13:
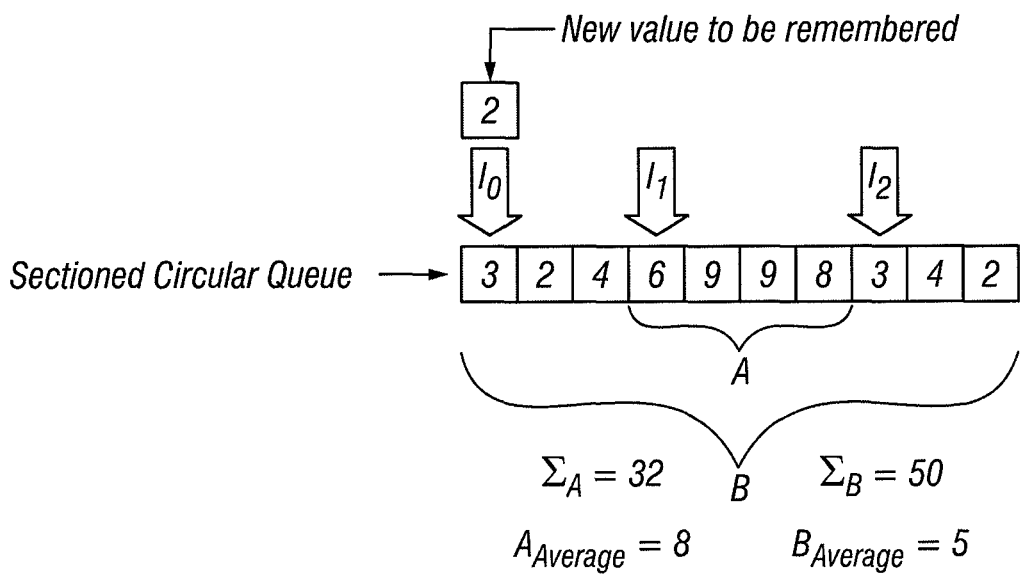
FIG. 13 illustrates shows a sectioned circular queue according to some embodiments of the invention.

FIG. 13 illustrates a sectioned circular queue for according to some embodiments of the invention. In FIG. 13, sub-section "A" is arranged such that it falls completely within sub-section "B". The overall size of the memory as well as the sizes of each sub-section and the temporal arrangement of sub-sections is determined according to the purpose for which the sums are being maintained.

In some embodiments of the invention, the circular queues are used for detecting locations of abrupt changes. Several important speech events, such as onsets, closures, stop bursts, etc, are associated with abrupt quasi-monotonic changes in the levels of some characteristics of the signal. A sectioned circular queue generally arranged as in FIG. 13 can be employed to detect abrupt quasi-monotonic changes. With the lengths of sub-sections "A" and "B" properly set, the perceptual difference between running sums of sub-sections "A" and "B" is computed at each time step. Times where the perceptual difference reaches a maximum and its magnitude exceeds its perceptual threshold become candidate segmentation points. Further qualifications are applied to more closely mimic human perception characteristics by enforcing a minimum time separation between detected events. Already at this stage, the events can start to be grossly categorized based on the direction of change at the event. For example, events due to closures are distinguished from onsets and bursts by the direction of energy change across the transition.

In some other embodiments of the invention, the circular queues are used in detecting impulses and gaps in speech signals. Some important speech events are associated with locations in time where some characteristic of the signal changes abruptly for a very brief period of time and then returns to a level similar to what it was prior to the change. If the brief change is to a higher value the change is called an "impulse". If the brief change is to a lower value the change is called a "gap". A sectioned circular queue generally arranged as in FIG. 5 can be employed to detect impulses and/or gaps. With the lengths of sub-sections "A" and "B" properly set, impulses (gaps) are located when the average value in sub-section "A" is above (below) the average value in sub-section "B" by a perceptually adaptive threshold value. As previously explained, the threshold function is determined empirically.

The lengths of sub-sections "A" and "B" are determined according to the nature of human perception and temporal characteristics of the signal aspects to be detected.

Glottal Pulse Detection

An important special case which illustrates the use of this approach is the detection of glottal pulse events. Glottal pulse events are located through the following procedure. First, the signal is band pass filtered in the range of the first formant. Next, the Teager energy is computed on the output of the band-pass filter. The Teager energy is computed as: Teager $(t)=x(t)*x(t)-x(t-1)*x(t+1)$; where $x(t)$ is the input value at time t.

Being a function of amplitude and frequency, the Teager energy emphasizes the locations of the glottal pulses, which are associated with local maximums of energy and high frequency components. Finally, the signal is segmented using an impulse detector generally arranged as in FIG. 13. The detector is based on running sums of absolute values of the Teager energy. In the preferred embodiment, the lengths of sub-sections "A" and "B" are set to 2 ms and 10 ms respectively. The detector is in a high state whenever the average Teager energy in sub-section "A" is greater than the perceptual threshold K multiplied by the average Teager energy in sub-section "B". The value of K was chosen to be 1.3. The lengths of sub-sections "A" and "B", and the value of multiplier K have been found to be useful for detecting glottal pulse locations. Values other than those described here may be used within the scope of this invention.

The glottal pulse detector just described creates two event locations for each glottal pulse, one on the rising edge of the pulse and one on the falling edge of the pulse. The pitch period is defined as the period between two sequential rising edge events. The duration of the pulse is estimated by the time between the rising edge and the subsequent falling edge. The ratio of the pulse duration to the total pitch period is related to the "open quotient", a feature of voiced speech which may be useful in some speech processing applications. Moreover, during the open portion of the pitch period the sub-glottal cavities are acoustically coupled with the oral cavities creating somewhat different formant patterns during this portion compared to the patterns of the closed portion. This fact may be advantageously exploited by arranging feature extraction in relation to these events.

Figure 14:
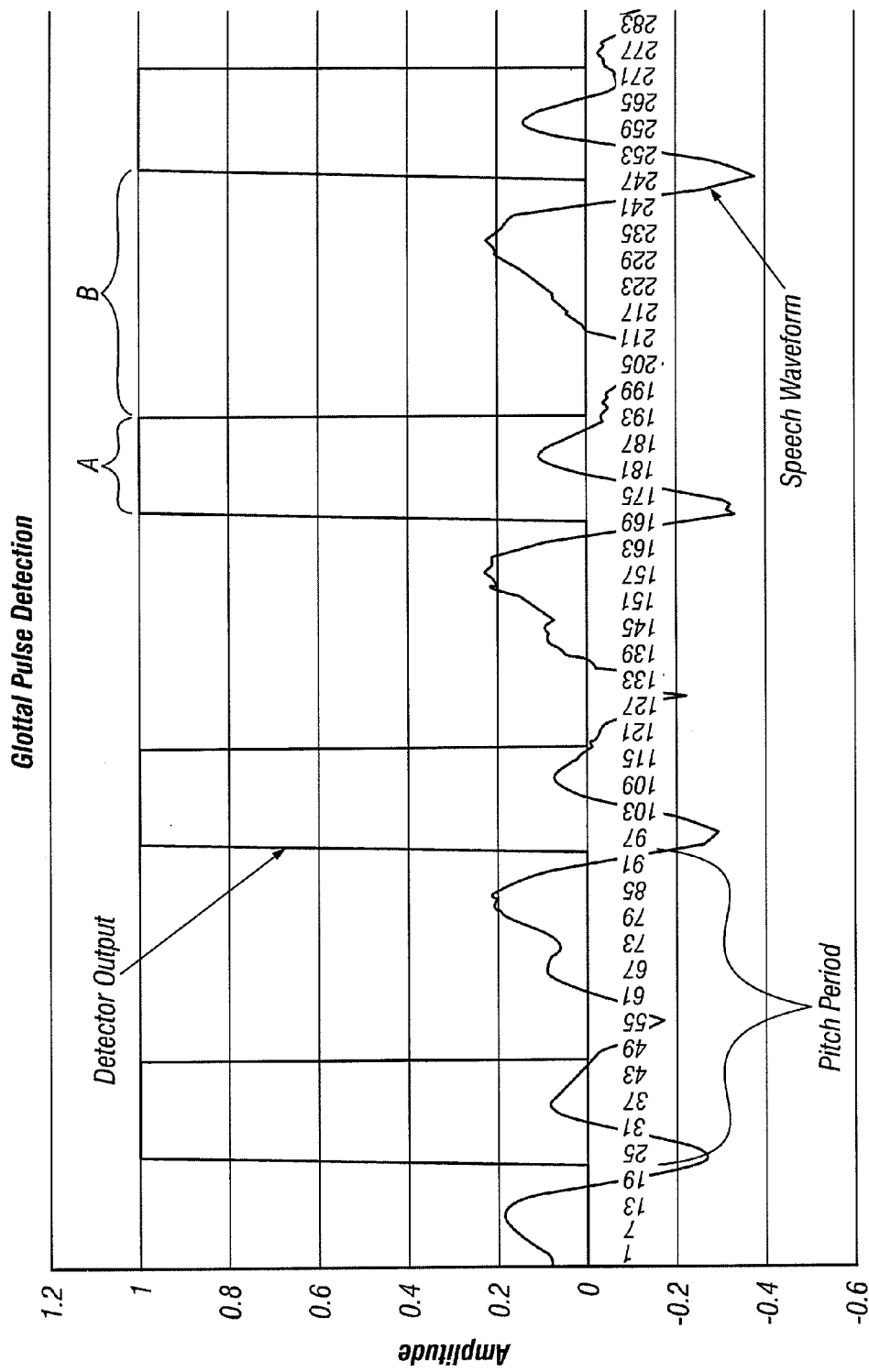
FIG. 14 illustrates a representation of an output of the glottal pulse detector on a small segment of voiced speech according to some embodiments of the invention.

FIG. 14 illustrates a representation of an output of the glottal pulse detector on a small segment of voiced speech according to some embodiments of the invention. In FIG. 14, the glottal pulse detector output divides the signal into "high" and "low" segments. The high segments represent times when a relevant feature (in this case Teager energy) is perceptually above the norm. This arrangement creates a segment for the duration of the pulse or gap. For some applications it may be preferable to mark a pulse or gap rather than a segment. In such cases the selection of specific event times may be determined by one of several alternate methods including, but not limited to:
- selecting the midpoint between the rising (falling) and falling (rising) edges;
- selecting the rising edge of the segment;
- selecting the falling edge of the segment;
- selecting the maximum (minimum) feature value within the segment; and
- selecting the point of maximum perceptual contrast within the segment.

Glottal pulse detection as outlined above is based on detecting when the average value of a certain signal characteristic (e.g., Teager energy) within a centrally arranged window deviates significantly from the same characteristic averaged over a longer time period. Sectioned circular queues generally arranged, as in FIG. 13, can be used to segment any modulating signal by identifying the regions where a selected speech characteristic (e.g. energy or formant frequency) perceptibly deviates from its longer term norm. Because the computational cost to maintain the running sums used by the detectors is independent of the length of the sub-sections, they can be used to segment large scale modulations just as well as brief impulses.

Syllable Nucleus Detection

To illustrate this point, a syllable nucleus detector was constructed using a sectioned circular queue generally arranged, as in FIG. 13, to maintain running sums of the Teager energy, computed exactly as for the glottal pulse detector except the length of sub-section "A" was set to 60 ms and the length of sub-section "B" was set to 100 ms.

Figure 15:
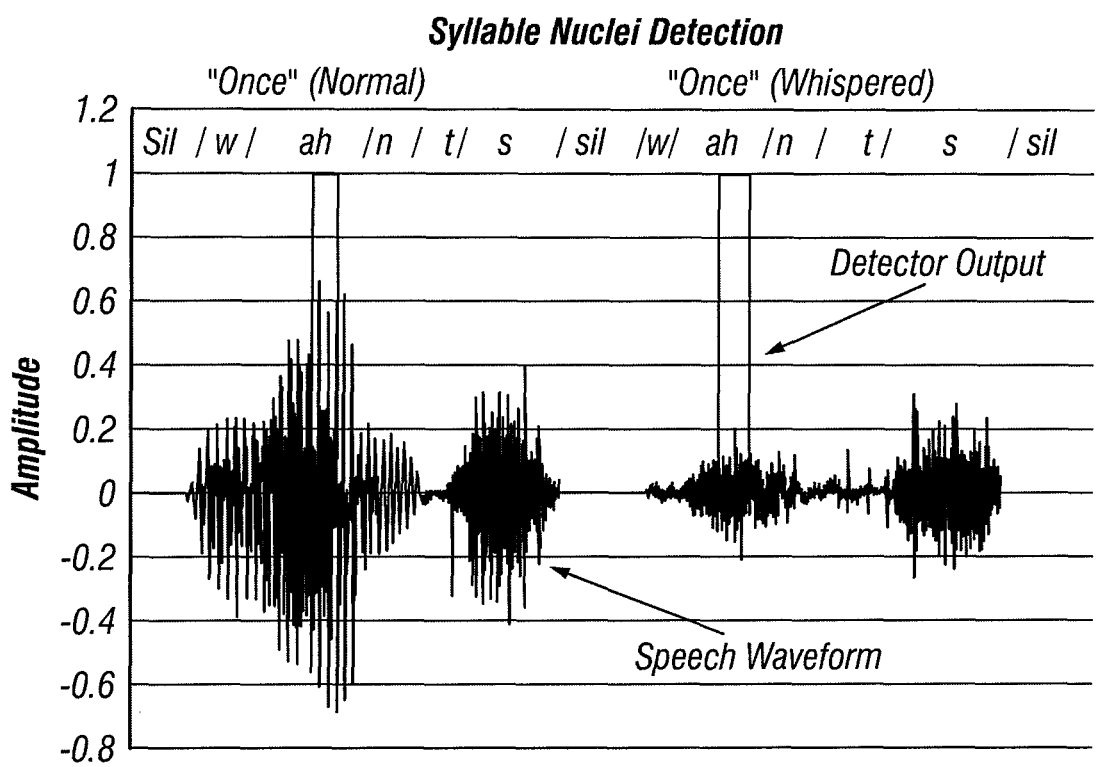
FIG. 15 illustrates a representation of a syllable nuclei detector according to some embodiments of the invention.

FIG. 15 illustrates a representation of a waveform output according to some embodiments of the invention. FIG. 15 shows the waveform and detector output for the word "Once" spoken twice, first normally and the second time in a whisper. As can be seen this detector generally brackets the central portions of syllables.

Some embodiments of the invention involve methods for recognizing speech patterns using formant extraction. As speech is produced, the configurations of the articulation organs (i.e. tongue, jaw, lips) create dynamic patterns of resonances and anti-resonances in the frequency spectrum called formants. During voiced speech, sound is generated by both diffuse "air noises" and strongly organized harmonic structure. Both the diffuse and harmonic components contribute to speech understanding and both are variably relied upon under different noise conditions. The diffuse "air noises" interact with the formants and are shaped by them, revealing them to be relatively smooth. The strong resolved harmonics create fairly sharp peaks in the spectrum and, if not processed appropriately, make it difficult to accurately locate nearby formants. The harmonic series provides an excellent means to determine pitch, even when the pitch period frequency itself is missing from the signal. Experiments have shown that the amplitude modulated harmonics can be used to recreate understandable speech which "ignores" noise. During unvoiced speech perceptible changes temporally divide the signal into quasi-homogenous segments.

Formant Extraction

Figure 16:
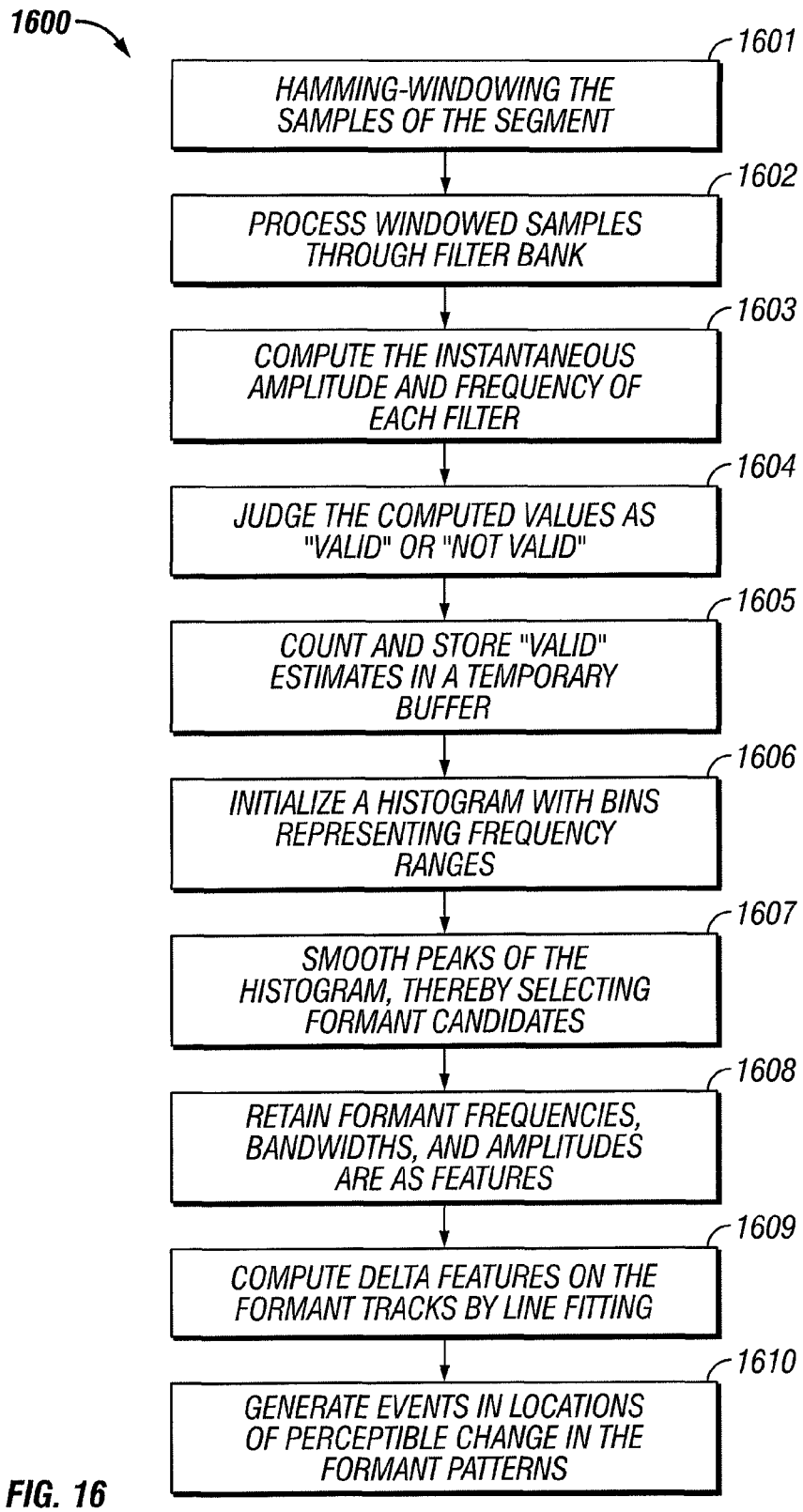
FIG. 16 illustrates a workflow for performing formant extraction according to some embodiments of the invention.

In some embodiments of the invention, a process of formant extraction is performed as described in FIG. 16. FIG. 16 illustrates a workflow 1600 for performing formant extraction according to some embodiments of the invention.

The workflow 1600 begins when the samples of the segment are Hamming-windowed 1601 with a window length equal to the segment length, wherein the segment corresponds to one pitch period during voiced speech. The windowed samples are then processed through a filter bank of wide band pass filters 1602. In some embodiments, the band pass filters have 400 Hz band widths and are spaced on 50 Hz centers covering the range from 450 Hz to 4000 Hz. Next, the workflow computes the instantaneous amplitude and frequency of each filter is computed using the DESA-1 technique 1603. Based on their numeric qualities, the computed values are judged as "valid" or "not valid" at step 1604. Next, Count and store "valid" estimates in a temporary buffer.

Next, initialize a histogram whose bins represent frequency ranges is initialized 1606, wherein for each valid estimate, the histogram bin representing the estimated instantaneous frequency is incremented by the corresponding log compressed estimated instantaneous amplitude. Next, the peaks of the smoothed histogram are selected as formant candidates 1607, the formant frequencies, bandwidths (sigmas), and amplitudes are retained as features 1608, and the delta features are computed on the formant tracks by line fitting 1609. Finally, in locations of perceptible change in the formant patterns, events are generated 1610.

12$^{th}$ Octave Filter Bank Processing

Figure 17:
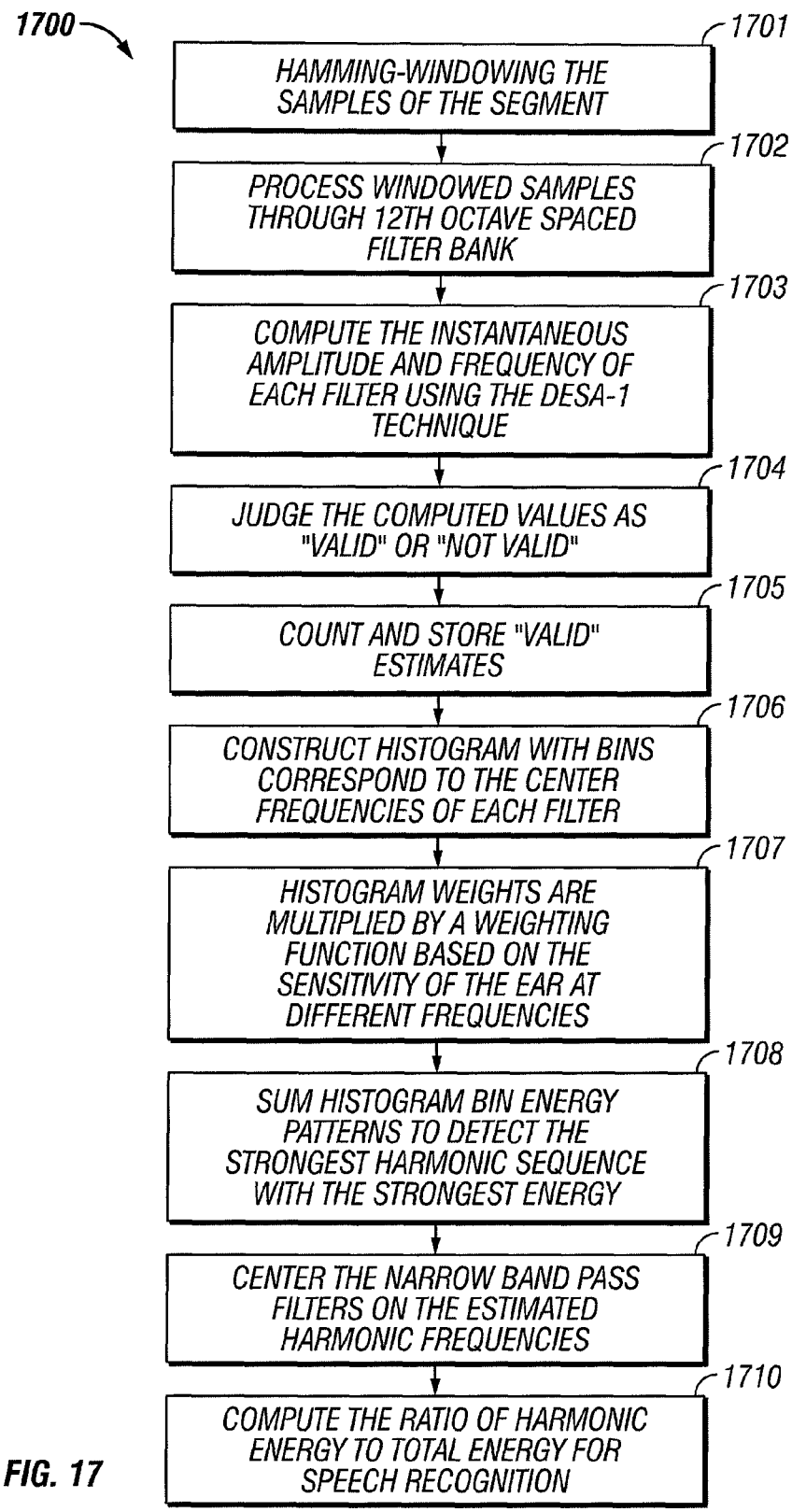
FIG. 17 illustrates a workflow for performing harmonic extraction according to some embodiments of the invention.

In some other embodiments of the invention, a process of 12th octave filter bank processing is performed on the segmented signal using narrow pass bands at lower frequencies and wider pass bands at higher frequencies mimicking the frequency resolution trends found in human hearing. FIG. 17 illustrates a workflow 1700 for performing formant extraction according to some embodiments of the invention.

The workflow 1700 begins as the samples of the segment are, synchronous with the signal, Hamming windowed 1701 with a window length equal to the segment length, wherein the segment corresponds to one pitch period. Next, the windowed samples are processed through a 12th octave spaced filter bank 1702 and the instantaneous amplitude and frequency of each filter is computed using the DESA-1 technique 1703. Based on their numeric qualities, the computed values are judged 1704 "valid" or "not valid", wherein "Valid" estimates are counted and stored in a temporary buffer for the interval 1705.

Next, a histogram, whose bins correspond to the center frequencies of each filter in the 12th octave filter bank, is constructed 1706, wherein for each valid estimate, the histogram bin whose range includes the estimated instantaneous frequency is incremented by the corresponding log compressed estimated instantaneous amplitude. Next, the histogram weights are multiplied by a weighting function based on the sensitivity of the ear at different frequencies 1707. After computing the histograms, the histogram bin energy patterns are summed in harmonic combinations to detect the strongest harmonic sequence with the strongest energy 1708, wherein the fundamental of the strongest harmonic sequence is used as an estimate of pitch. If the application requires even more accurate estimates, narrow band pass filters are centered on the estimated harmonic frequencies and recomputed 1709. This process quickly converges on highly accurate estimates. Finally, the ratio of harmonic energy to total energy is computed as a measure of voicing 1710, wherein the amplitude ratio patterns of the harmonics are kept as features, wherein the ratio is used in automatic speech recognition.

Use of Pitch Periods

In some embodiments of the invention, the onset and offsets of harmonic tracks can be determined by relative amplitudes from pitch period to pitch period. Abrupt changes in the amplitude of the harmonics tracks are associated with the interaction of the harmonics with the formants, and the abrupt changes indicate a change in the interaction, which may be due to a change in the pitch or a change in the formant. Such changes are indicative of a transitional location. Events can be generated in response to these changes using the filter methods previously outlined. Note that these events, when they occur, will be synchronous with the glottal pulse timings.

Vocal Tract Normalization and Soft Phoneme Segment Recognition

In some embodiments of the invention a process of vocal tract normalization and soft phoneme segment recognition is employed to remedy complications inherent in using formant patterns as features. The formant patterns generated by a speaker simultaneously encode information about the speech sounds being produced and the vocal tract length of the speaker. This complicates the use of formant patterns as features.

It has been observed in Watanabe, et al., *Reliable methods for estimating relative vocal tract lengths from formant trajectories of common words*, IEEE transactions on audio, speech, and language processing, 2006, vol. 14, pp. 1193-1204, that the formants for two speakers producing the same speech sound have a relationship inversely proportional to the ratio of their vocal tract lengths: $L_A/L_B=F_{nB}/F_{nA}$ As different speech sounds are produced, the speaker's vocal tract length is continuously modified by the dynamic reconfiguration of the articulation organs. For a given speaker, as each sound is produced the formants will move up or down because they are modifying the vocal tract length. Applying Watanabe's formula, to the formant pattern of speaker "A" pronouncing a certain speech sound and the formant pattern of speaker B pronouncing the same sound, provides one estimate of their relative vocal tract lengths for each measured formant. Id. Some aspects of the invention are based on the following observations. First, if speaker "A" and speaker "B" are producing the same sound, the relative vocal tract estimates based on each of the various measured formants will approximate the true value and will therefore will be similar to each other. Next, if speaker "A" and speaker "B" are producing different sounds, the estimates of relative vocal tract length based on each of the various measured formants will be divergent. Additionally, if the transition from a certain speech sound involves the lengthening (shortening) of the vocal tract length when spoken by speaker "A", it will also involve the lengthening (shortening) of the vocal tract length of speaker "B" but by different amounts based on their physiology.

In some embodiments, the formant values for each speech sound, as spoken by a reference speaker, are recorded. The formant measurements of the reference speaker may be based on a single speaker or more, preferably be taken as the average from the measurements of many speakers. At recognition time, each segment is processed to produce formant values as previously described. Each speech sound (i.e. phoneme or partial phoneme) is in turn assumed to be the one being spoken, and the formant values of the current segment are used to compute estimates of relative vocal tract length of the current speaker to that of the reference speaker. The consistency of the estimates is recorded for each sound. Based on the list of consistencies, the relative likelihood of each speech sound may be established. As the trajectory of speech approaches the target configuration of each canonical formant pattern, the consistency of the estimates will increase and at such target times will tend to be greatest for the perceived speech sound. The confidence which may be applied to such perceptions is dependent on the speech sound and noise conditions. When speech sounds are determined with high confidence, they become reference points in the signal useful for constraining the possible patterns in the regions with less confidence.

Tandem Parallel Automatic Speech Recognition Engines

Some embodiments of the invention involve using a plurality of tandem parallel automatic speech recognition (ASR) engines in temporally overlapping burst mode to reduce latency and improve accuracy. Each ASR engine may be of similar or dissimilar design and origin, but all must be able to produce acceptable results in the target language in the central portion of the segment within the minimum segmentation time frame. The results of the tandem processors are analyzed by weighting the words produced during the central portion of each segment higher than the words at the beginning and end, syncing the segments by best fit, and the words with higher weight are selected for output.

These embodiments involve using multiple ASR engines on overlapping audio speech segments to reduce latency and improve accuracy. The tandem parallel approach increases accuracy while reducing latency.

For example, if one ASR arbitrarily segments an incoming speech signal at x seconds, the output tends to be most accurate at the x/2 location, and least accurate at the beginning and end of the segment, since the highest context in both the forward and backward direction is found in the central location. Given this observed behavior, one should be able to use this information as leverage simply by running n instances of an ASR engine in batch mode, segmenting the incoming signal into x second bursts overlapping by x/n seconds, and alternating the routing of these segments between each engine. If n=2, while engine B is working on recognizing its segment, the output from engine A is analyzed along with the previously output word stream to statistically boost, correct, and output the words from engine A. Then, at the n second input boundary, the output analyzer and processing tasks switch duties between the engines.

In observing a typical ASR engine useful in a tandem configuration, we see that x appears to work best when set around three seconds when using a three-thousand word WSJ English language model. This allows for the possibility to use the engine, which is designed and optimized to work on long utterances, to be adapted for use in environments where low latency is necessary.

In other words, if x=3, the first speech segment at 0.0-3.0 seconds will be presented for rendering to Engine A. The segment from 1.5-4.5 then will be presented to engine B, etc.

FIG. 18 illustrates a representation of two tandem processing engines, overlapping in time, operating on a sequence of utterances according to some embodiments of the invention. As shown in FIG. 18, the words, "is falling from the sky" is output from engine A, and "done the sky today at" comes from engine B. By employing statistical methods discounting the weight for each word at the ends of each segment which takes into account the reliability factor for those word, we could end up with an apparent continuous word stream like "is falling from the sky today at" with a fixed latency of 3 seconds.

The weighting analysis and output engine may include one or more algorithms in the following categories as well as others to determine which words will be added to the final output stream. For example, an algorithm may involve simple weighting of the central words in a segment with higher values than the words at the edges of the segment, acoustic and prosodic hints gained from the original speech signal, statistical analysis of the words to be output to boost the weights of the more likely output, grammatical rules to select the more likely output, or other machine learning and statistical methods.

Automatic Punctuator

Some embodiments of the invention involve automatically inserting punctuation marks into an unpunctuated text. An automatic punctuator is a system which inserts punctuation marks (periods, commas, question marks, exclamation points, apostrophes, quotations marks, brackets, ellipses, semicolons and colons) into an unpunctuated text.

Figure 19:
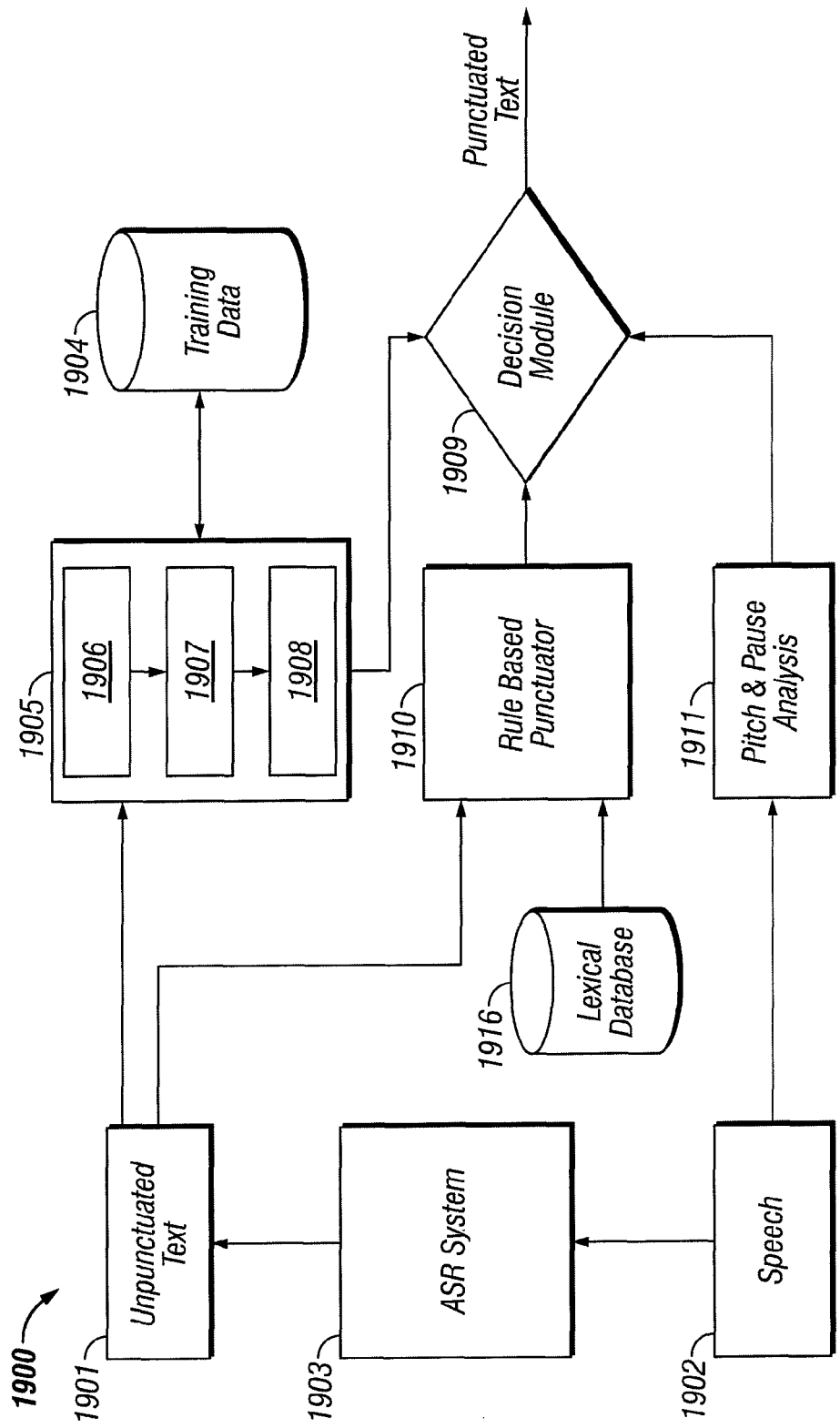
FIG. 19 illustrates a speech-to-text system including an automatic punctuator according to some embodiments of the invention.

FIG. 19 illustrates a speech-to-text system 1900 including an automatic punctuator according to some embodiments of the invention. In some embodiments of the invention, unpunctuated text can originate as a text 1901, or as spoken language 1902 which is then transcribed to text by an automatic speech recognition system 1903.

The transcribed text or the native next from 1901 is sent to the automatic punctuator 1905. The automatic punctuator

1905 creates a text which is more easily readable and less ambiguous due to the proper placement of punctuation marks.

In some embodiments of the invention, the automatic punctuator 1905 is coupled with a database 1904 containing training data. The automatic punctuator uses one or more Bayesian algorithm that is trained on a large quantity of training text which is correctly punctuated. The punctuation patterns in the training data are analyzed to create a set of rules that describe the punctuation patterns in the text.

Once the punctuator has been trained on a sufficient quantity of text, its rules can then be applied to a new text to predict where punctuation marks should be inserted.

In some embodiments of the invention, the automatic punctuator 1905 comprises a plurality of processing modules. As shown, the automatic punctuator includes a first statistical processor 1906, a second statistical processor 1907, and a third statistical processor 1908.

In some embodiments, the first statistical processor 1906 identifies places where punctuation should be inserted based on statistical rules. A training process is conducted to develop the rules. The training process involves analysis of the correlations between specific words and punctuation marks in a large quantity of properly punctuated text. The set of rules is derived from this analysis. The set of rules can then be applied to a new, unpunctuated text to predict likely locations for punctuation marks. The output of this process is a series of opinions about where punctuation marks should be inserted.

In some embodiments, the second statistical processor 1907 trains on the correlations of parts-of-speech with punctuation marks. This process relies on a part-of-speech tagger which analyzes the structure of the sentences in the training data and assigns a part-of-speech tag to each word. Examples of part-of-speech tags are noun, verb, adjective, preposition, etc.

The process then builds a set of rules based on its observations of how certain parts-of-speech correlate with punctuation marks. Then the rule set can be applied to a new text. The output of this process is a series of opinions about where punctuation should be inserted in within the text.

In some embodiments, the third statistical processor 1908 utilizes weighting based on average sentence lengths. The third component of the statistical punctuator is based on the number of words that typically make up sentences in a particular text. Like the other processes, it trains on a large quantity of correctly punctuated text. The rules are developed based on the number of n-grams that occur in units of text that are bounded by punctuation.

In some embodiments of the invention, the results from the first statistical processor 1906 and the second statistical processor 1907 are two sets of opinions on where punctuation should be inserted in a text. The results from the third statistical processor 1908 are then used as a sort of tie-breaker to resolve situations when the decisions are in conflict. For example, if the first statistical processor 1906 predicts that a period is needed after the fifth word in a string, and the second statistical processor 1907 predicts that a period is needed after the third word, the results from the third statistical processor 1908 would be called to make the decision, since it's unlikely that both are correct, because a two-word sentence would be formed.

In some embodiments, the third statistical processor 1908 assigns a higher weight to the results from either the first statistical processor 1906 or the second statistical processor 1907 based on its knowledge of the typical sentence length in this type of document. If sentences in the document type are typically very short, the third statistical processor 1908 might assign greater weight to the output of the second statistical processor 1907. If, on the other hand, sentences in the document type are usually five words or longer, it would assign greater weight to the opinion generated by the first statistical processor 1906.

Once the decision-making step is completed, the result is passed to a decision module 1909 that will make the final decision about where to insert punctuation, in concert with information from a rule-based punctuation module 1910 and a pitch/pause module 1911.

In some embodiments, a rule-based punctuation module 1910 uses a set of rules about linguistic structure to determine where punctuation marks should be inserted into text. The rule-based punctuation module 1910 is coupled with a lexical database 1916.

The rule-based punctuation module 1910 can identify several functional classes of words, including subject pronouns, object pronouns, relative pronouns, modals, conjunctions, definite articles, dates and certain categories of verbs. In some embodiments, the lexical database 1916 includes part-of-speech information.

Once the program has identified a member of one of the functional categories, it proceeds to search the nearby context, looking at a window of text consisting of the identified item, and two words preceding and following. Specific categories of words or parts-of-speech occurring in the context window will indicate the need for a comma at some point in the string. The linguistic rules serve as an instruction list for where the commas should be inserted. As an example, when the program identifies a subject pronoun (I, he, she, we, they) it checks the context window for the occurrence of other categories. If, for example, the subject pronoun is preceded by an adverb or a participle (with certain verb participles expected) the program will predict that there should be a comma after the word preceding the identified word. The rule-based punctuator can process a stream of text or a pre-existing text file. The output of the rule-based punctuator is a series of opinions about where commas should be inserted.

In some embodiments, the pitch/pause module 1911 is different from the other components in that its input is an audio file containing human speech. The other components operate on text, although the text may have originated as audio data which was then transcribed. The pitch/pause module 1911 operates on the observation that in human speech, significant pitch changes that take place over a short period of time and are correlated with a period of silence are usually indicative of a need for punctuation. For example, if a given point in the audio file shows a steep drop in pitch (30% or more) occurring in a short time period (275 ms), that is a likely indicator that the speaker has reached the end of a sentence.

The presence of a pause following this pattern tends to confirm that a location for a punctuation mark has been identified. The pitch/pause punctuator tracks the pitch of an audio file and signals when the correct conditions have been met to indicate punctuation. The pitch/pause punctuator outputs opinions about where punctuation marks should be inserted.

In some embodiments, the decision module 1909 takes input from the automatic punctuator 1905, rule-based punctuator 1910, and pitch/pause module 1911. Based on known characteristics of the type of text, the decision module 1909 assigns higher or lower weights to each of these results to make a final determination about whether or not punctuation should be inserted at a given point in the text.

The invention claimed is:

1. A system for recognizing speech that corresponds to a digital speech signal, the system comprising:
   a speech recognition engine that has access to a training corpus of known-class digitized speech utterances, a plurality of weak classifiers, wherein each weak classifier comprises a decision function for determining the presence of an event within the training corpus, and an ensemble detector comprising a plurality of the weak classifiers, that together are better at determining the presence of a speech signal event than any of the constituent weak classifiers;

wherein the speech recognition engine comprises an event extractor for extracting speech signal events and patterns of the speech signal events from the digital speech signal, wherein the speech signal events and patterns of the speech signal events are relevant in speech recognition, wherein the speech recognition engine comprises at least one processor that is configured to perform a plurality of operations, wherein the plurality of operations comprise detecting locations of relevant speech signal events in the digital speech signal, wherein each of the speech signal events comprise spectral information and temporal information, capturing spectral features of and temporal relationships between all of the speech signal events, segmenting the digital speech signal based on the detected locations of the detected speech signal events, analyzing the segmented digital speech signal, wherein the analysis is synchronized with the speech signal events, detecting patterns in the digital speech signal with the captured spectral information, the temporal relationships, and the analyzed digital speech signal, providing a list of perceptual alternatives for recognized speech data that corresponds to the detected patterns in the digital speech signal, and disambiguating between the perceptual alternatives for the recognized speech data based on the analysis of one or more of the speech signal events to improve the recognized speech data;

wherein the at least one processor is configured to perform one or more of the operations using the ensemble detector; and a module coupled to the speech recognition engine, wherein the module is configured to output the improved recognized speech data.

2. The system of claim 1, further comprising:
a mechanism for initiating at least one action in response to at least a portion of the output improved recognized speech data.

3. The system of claim 2, wherein the at least one action comprises any of
a conversion of the improved recognized speech data into at least one text stream, or
a suppression of an audio output when certain words are detected.

4. The system of claim 2, further comprising:
a mechanism to detect at least one command in the improved recognized speech data;
wherein the at least one action comprises an initiation of response to the detected command.

5. The system of claim 1, further comprising:
the training corpus of known-class digitized speech utterances;
wherein the at least one processor is further configured to establish the plurality of weak classifiers, and construct the ensemble detector.

6. The system of claim 5, wherein the at least one processor is configured to iteratively construct the ensemble detector with a boosting algorithm to form a boosted ensemble detector.

7. The system of claim 6, wherein the at least one processor is configured to simplify the constructed boosted ensemble detector.

8. The system of claim 7, wherein the at least one processor is configured to convert the simplified constructed boosted ensemble detector into a cascading detector.

9. The system of claim 1, wherein the list of the perceptual alternatives for the recognized speech data comprises a plurality of perceptual clusters.

10. The system of claim 1, wherein the at least one processor is further configured to reject one or more regions of the digital speech signal that do not contain one or more of the speech signal events.

11. The system of claim 1, wherein the at least one processor is further configured to detect sequences of the speech signal events based on the detected patterns.

12. The system of claim 1, wherein the at least one processor is further configured to recognize alternative speech cues to strengthen recognition.

13. The system of claim 1, further comprising:
a pre-segmentation filter; and
a feature extractor;
wherein the pre-segmentation filter is configured to define intervals that are used to synchronize feature computations;
wherein the segmenting of the digital speech signal is based on perceptual differences of the defined intervals; and
wherein the feature extractor is configured to extract features relative to the speech signal events from the segmented digital speech signal.

14. The system of claim 1, wherein the at least one processor is further configured to
convert the improved recognized speech data into at least one text stream, and
automatically insert punctuation into the at least one text stream.

15. A method of speech recognition comprising the steps of:
accessing
a plurality of weak classifiers, wherein each weak classifier comprises a decision function for determining the presence of an event within a training corpus of known-class digitized speech utterances, and
an ensemble detector comprising a plurality of the weak classifiers, that together are better at determining the presence of a speech signal event than any of the constituent weak classifiers;
receiving a speech signal;
digitizing the received speech signal;
detecting locations of relevant speech signal events in the received and digitized speech signal, wherein each of the relevant speech signal events comprise spectral information and temporal information;
capturing spectral features of and temporal relationships between all of the speech signal events;
segmenting the received and digitized speech signal based on the detected locations of the speech signal events;
analyzing the segmented, received and digitized speech signal, wherein the analysis is synchronized with the speech signal events, detecting patterns in the digitized speech signal with the captured spectral information, the temporal relationships, and the analyzed speech signal;

recognizing speech data that corresponds with the analyzed digitized speech signal, wherein the step of recognizing the speech data comprises the steps of providing a list of perceptual alternatives for the recognized speech data that corresponds to the detected patterns in the digitized speech signal, and disambiguating between the perceptual alternatives for the recognized speech data based on the analysis of one or more of the speech signal events to improve the recognized speech data; and outputting the improved speech data.

16. The method of claim 15, further comprising the steps of:

establishing the plurality of weak classifiers; and constructing the ensemble detector;

wherein the step of constructing an ensemble detector comprises the steps of storing a plurality of speech signals, wherein the speech signals comprise stored training examples stored in an automatic speech recognition system, extracting event patterns from a plurality of stored training examples, wherein the event patterns comprise distinctive characteristic locations in the stored plurality of speech signals, and iteratively performing the steps of accessing a sample of the plurality of speech signals having matching event patterns, aligning events from individual speech signals from among the samples, wherein the alignment comprises lining up the events from the individual speech signals temporally based on the matching event patterns, evaluating the effectiveness of a plurality of weak detectors in detecting the event patterns, applying a weighting scheme to the plurality of weak detectors based on the relative effectiveness of the weak detectors, wherein the most effective weak detectors are weighted highest, and adding at least one additional weak detector to the plurality of weak detectors;

wherein the iteration is performed until the effectiveness of the weighting scheme performs to a set standard of efficiency for detecting the event patterns.

17. The method of claim 16, wherein the step of accessing a sample of the plurality of speech signals having matching event patterns further comprises the step of automatically identifying regions in the plurality of speech signals that contain the event patterns, which comprises the steps of aligning the plurality of speech signals relative to a common time axis, projecting one or more event locations of the individual speech signals onto the common time axis, and identifying regions on the time axis having a concentration of the event locations in the form of regions in the plurality of speech signals that contain the event patterns.

18. The method of claim 15, wherein the step of accessing a sample of the plurality of speech signals having matching event patterns further comprises the step of automatically identifying regions in the plurality of speech signals that contain the event patterns, which comprises the steps of:

accessing a training set;

converting the speech signal into time-trajectory space regions containing all of the speech signal events from positive training examples; and repeatedly performing the steps of computing the counts of negative examples for all of the time-traiectory space regions, selecting a region of the time-trajectory space regions with the fewest events from negative training examples, and eliminating negative examples with no speech signal events in the selected region from further consideration;

until a cascade is created that operates perfectly on said training set.

19. A system for recognizing speech that corresponds to a digital speech signal, the system comprising:

a speech recognition engine that has access to a training corpus of known-class digitized speech utterances, a plurality of weak classifiers, wherein each weak classifier comprises a decision function for determining the presence of an event within the training corpus, and an ensemble detector comprising a plurality of the weak classifiers, that together are better at determining the presence of a speech signal event than any of the constituent weak classifiers;

wherein the speech recognition engine comprises an event extractor for extracting speech signal events and patterns of the speech signal events from the digital speech signal, wherein the speech signal events and patterns of the speech signal events are relevant in speech recognition, wherein the speech recognition engine comprises at least one processor that is configured to perform a plurality of operations, wherein the plurality of operations comprise detecting locations of relevant speech signal events in the digital speech signal, wherein each of the speech signal events comprise spectral information and temporal information, capturing spectral features of and temporal relationships between all of the speech signal events, segmenting the digital speech signal based on the detected locations of the detected speech signal events, analyzing the segmented digital speech signal, wherein the analysis is synchronized with the speech signal events, detecting patterns in the digital speech signal with the captured spectral information, the temporal relationships, and the analyzed digital speech signal, providing a list of perceptual alternatives for recognized speech data that corresponds to the detected patterns in the digital speech signal, and disambiguating between the perceptual alternatives for the recognized speech data based on the analysis of one or more of the speech signal events to improve the recognized speech data;

wherein the at least one processor is configured to perform one or more of the operations using the ensemble detector;

a module coupled to the speech recognition engine, wherein the module is configured to output the improved recognized speech data;

an automatic punctuation engine coupled with a database containing training data, wherein the automatic punctuation engine comprises at least one statistical processor for adding punctuation to the improved recognized speech data using the training data in the form of statistical-based punctuated text;

a rule-based punctuator coupled with a lexical rule database, wherein the rule-based punctuator adds punctuation to the improved recognized speech data using rules from the lexical rule database in the form of rule-based punctuated text; and a decision module for determining whether the punctuated text or the statistical-based punctuated text produces a better punctuated result; and a mechanism that is configured to output the better punctuated result, based upon the determination.

* * * * *